(12) United States Patent
Nakashima et al.

(10) Patent No.: US 9,654,216 B2
(45) Date of Patent: May 16, 2017

(54) OPTICAL TRANSMITTER AND WAVEFORM DISTORTION CORRECTION METHOD

(71) Applicant: FUJITSU LIMITED, Kawasaki-shi, Kanagawa (JP)

(72) Inventors: Hisao Nakashima, Kawasaki (JP); Takahito Tanimura, Kawasaki (JP); Yuichi Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/854,392

(22) Filed: Sep. 15, 2015

(65) Prior Publication Data

US 2016/0099776 A1    Apr. 7, 2016

(30) Foreign Application Priority Data

Oct. 2, 2014   (JP) .................................. 2014-203833

(51) Int. Cl.
*H04B 10/2507* (2013.01)
*H04B 10/588* (2013.01)
(Continued)

(52) U.S. Cl.
CPC ... *H04B 10/2507* (2013.01); *H04B 10/50572* (2013.01); *H04B 10/50575* (2013.01);
(Continued)

(58) Field of Classification Search
CPC combination set(s) only.
See application file for complete search history.

(56) References Cited

U.S. PATENT DOCUMENTS 5,870,668 A      2/1999  Takano et al.
2009/0116839 A1*  5/2009  Kikuchi ................. H04J 14/02
                                                    398/79
(Continued)

FOREIGN PATENT DOCUMENTS

JP       9-64780      3/1997
JP       2011-135492  7/2011

OTHER PUBLICATIONS

Extended European Search Report mailed Mar. 2, 2016 in related European Application No. 15186431.1.

*Primary Examiner* — David Payne
*Assistant Examiner* — Omar S Ismail
(74) *Attorney, Agent, or Firm* — Staas & Halsey LP

(57) ABSTRACT

An optical transmitter includes: a mapper configured to generate an electric-field-information signal from transmission data; a training-signal-generation section configured to generate a training signal; a training-signal-insertion section configured to insert the training signal into the electric-field-information signal; a driver configured to generate a drive signal from the electric-field-information signal into which the training signal is inserted; a modulator configured to generate an optical-modulation signal based on the drive signal; an optical receiver configured to generate an intensity signal indicating intensity of the optical-modulation signal; a training-signal-extraction section configured to extract an intensity-training signal corresponding to the training signal, from the intensity signal; a coder configured to generate a coded-training signal by coding the intensity-training signal extracted by the training-signal-extraction section using the training signal generated by the training-signal-generation section; and a distortion detection section configured to detect waveform distortion of the optical-modulation signal, based on the coded-training signal.

13 Claims, 20 Drawing Sheets

(51) Int. Cl.
   *H04B 10/50* (2013.01)
   *H04B 10/54* (2013.01)

(52) U.S. Cl.
   CPC ......... *H04B 10/541* (2013.01); *H04B 10/588* (2013.01); *H04B 2210/072* (2013.01)

(56) References Cited

U.S. PATENT DOCUMENTS

| | | | |
|---|---|---|---|
| 2009/0232518 A1* | 9/2009 | Caton | H04B 10/5051 398/193 |
| 2010/0080570 A1* | 4/2010 | Conroy | H04B 10/5057 398/154 |
| 2011/0305457 A1* | 12/2011 | Kikuchi | H04B 10/5055 398/65 |
| 2012/0250793 A1 | 10/2012 | Khatana et al. | |
| 2014/0308047 A1* | 10/2014 | Mak | H04B 10/5055 398/182 |

* cited by examiner

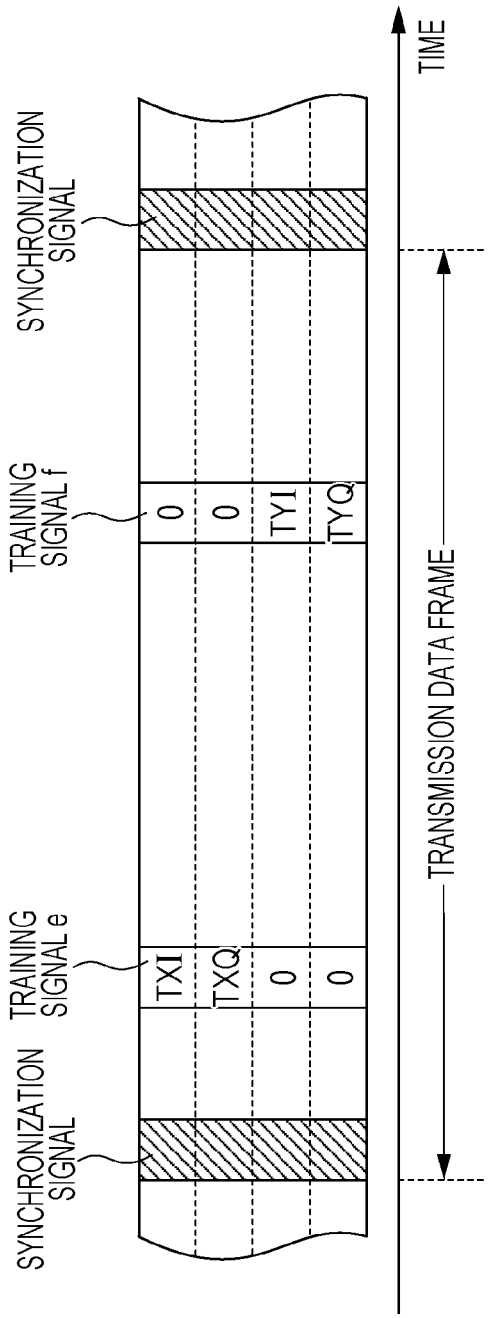

OPTICAL TRANSMITTER AND WAVEFORM DISTORTION CORRECTION METHOD

CROSS-REFERENCE TO RELATED APPLICATION

This application is based upon and claims the benefit of priority of the prior Japanese Patent Application No. 2014-203833, filed on Oct. 2, 2014, the entire contents of which are incorporated herein by reference.

FIELD

The embodiments discussed herein are related to an optical transmitter and a waveform distortion correction method.

BACKGROUND

A technology has been proposed in which a plurality of bits is transmitted in one symbol time in order to achieve high-speed and high-capacity optical transmission. In multivalue modulation, a plurality of bits is transmitted using one symbol. For example, quadrature phase shift keying (QPSK) and m-quadrature amplitude modulation (m-QAM, and "m=16, 64, 256, or the like" is satisfied) have been put into practical use. In addition, in polarization multiplexing, a signal is transmitted using two polarization beams orthogonal to each other.

Recently, the multivalue modulation is achieved by digital signal processing. For example, a transmitter includes a digital signal processing circuit and an in-phase/quadrature (I/Q) modulator. The digital signal processing circuit generates a drive signal from transmission data. The I/Q modulator generates an optical modulation signal by modulating a carrier light using the drive signal applied from the digital signal processing circuit. In addition, a receiver includes a front-end circuit and a digital signal processing circuit. The front-end circuit converts a received optical modulation signal into an electric field information signal. The digital signal processing circuit regenerates transmission data, based on the electric field information signal.

In the multivalue modulation in which the number of bits per one symbol is large, it is expected that the demand for perfection of the transmitter becomes severe. The imperfection of the transmitter causes waveform distortion of an optical modulation signal. As factors that cause the waveform distortion of the optical modulation signal, for example, there are the following examples.

(1) Nonlinearity of a driver or an I/Q modulator, or harmonic distortion
(2) Skew of a drive signal of an I/Q modulator
(3) Lack of an analog bandwidth of a digital-to-analog converter (DAC), a driver, an I/Q modulator, or wiring (substrate, cable, connector, or the like)
(4) Extinction ratio of an I/Q modulator
(5) Bias of each arm of an I/Q modulator
(6) Bias of $\pi/2$ phase shifter of an I/Q modulator
(7) Polarization beam extinction ratio of a polarization beam combiner
(8) Phase noise of a light source
(9) Deviation of the oscillation frequency of a light source (for example, for ITU-T grid)

In order to improve the quality of an optical modulation signal, it is desirable that waveform distortion caused by the above-described factor is detected, and compensated or suppressed. Japanese Laid-Open Patent Publication No. 9-64780 and Japanese Laid-Open Patent Publication No. 2011-135492 describe related technologies, for example.

The waveform distortion of the optical modulation signal caused by the imperfection of the transmitter (that is, the waveform distortion generated in the transmitter) may be detected, for example, using a digital coherent receiver. However, when a digital coherent receiver specific to detection of the waveform distortion is provided, cost of an optical transmission system is increased. The waveform distortion of the optical modulation signal may be detected using a digital coherent receiver in the opposite device of the optical transmission system. However, in this configuration, the detected waveform distortion includes distortion of a transmission path (transmission line) in addition to the distortion caused by the imperfection of the transmitter. Therefore, it is difficult to accurately detect the distortion caused by the imperfection of the transmitter, and it is difficult to accurately compensate the distortion.

SUMMARY

According to an aspect of the invention, an optical transmitter includes: a mapper configured to generate an electric-field-information signal from transmission data; a training-signal-generation section configured to generate a training signal; a training-signal-insertion section configured to insert the training signal into the electric-field-information signal; a driver configured to generate a drive signal from the electric-field-information signal into which the training signal is inserted; a modulator configured to generate an optical-modulation signal based on the drive signal; an optical receiver configured to generate an intensity signal indicating intensity of the optical-modulation signal; a training-signal-extraction section configured to extract an intensity-training signal corresponding to the training signal, from the intensity signal; a coder configured to generate a coded-training signal by coding the intensity-training signal extracted by the training-signal-extraction section using the training signal generated by the training-signal-generation section; and a distortion detection section configured to detect waveform distortion of the optical-modulation signal, based on the coded-training signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17 is a diagram illustrating an example of a training signal used in a fourth embodiment;

DESCRIPTION OF EMBODIMENTS

Figure 1:
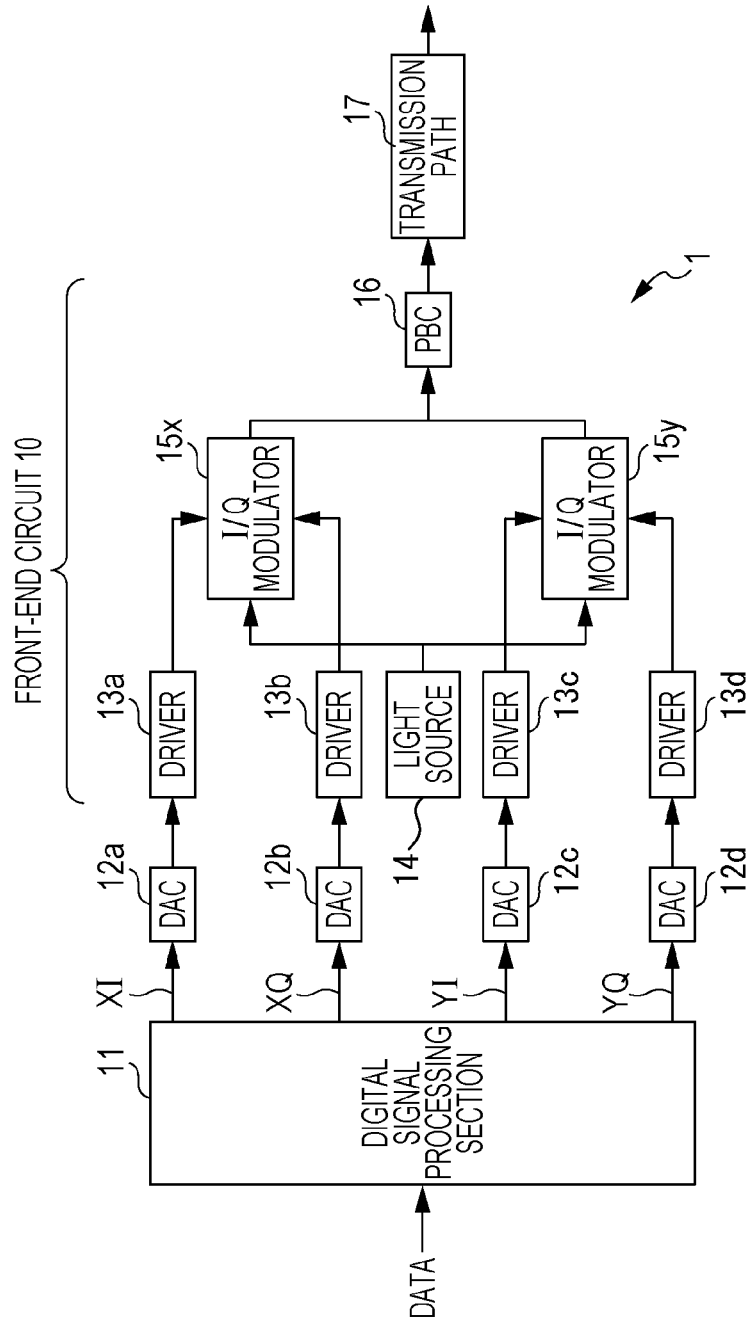
FIG. 1 is a diagram illustrating an example of an optical transmitter.

FIG. 1 is a diagram illustrating an example of an optical transmitter. An optical transmitter 1 includes a digital signal processing section 11, digital-to analog converters (DACs) 12a to 12d, drivers 13a to 13d, a light source 14, I/Q modulators 15x and 15y, and a polarization beam combiner (PBC) 16. The drivers 13a to 13d, the light source 14, the I/Q modulators 15x and 15y, the PBC 16 constitute a transmitter front-end circuit 10. The digital signal processing section may include a digital signal processor, a Field Programmable Gate Array, and/or application specific integrated circuits.

The digital signal processing section 11 generates an electric field information signal from transmission data by digital signal processing. In this example, the optical transmitter 1 transmits data using a polarization multiplexing scheme. Thus, the digital signal processing section 11 generates electric field information signals EX (XI and XQ) corresponding to data transmitted using an X polarization beam and generates electric field information signals EY (YI and YQ) corresponding to data transmitted using a Y polarization beam.

The DACs 12a, 12b, 12c, and 12d respectively convert the electric field information signals XI, XQ, YI, and YQ generated by the digital signal processing section 11, into analog signals. The drivers 13a, 13b, 13c, and 13d respectively generate drive signals XI, XQ, YI, and YQ from the electric field information signals XI, XQ, YI, and YQ output from the DACs 12a, 12b, 12c, and 12d. The light source 14 generates a continuous light having a prescribed frequency.

The I/Q modulator 15x generates an optical modulation signal X by modulating the continuous light using the drive signals XI and XQ. Similarly, the I/Q modulator 15y generates an optical modulation signal Y by modulating the continuous light using the drive signals YI and YQ. In the example, each of the I/Q modulators 15x and 15y corresponds to a Mach-Zehnder modulator. The PBC 16 generates a polarization beam multiplexed optical signal by combining the optical modulation signal X generated by the I/Q modulator 15x with the optical modulation signal Y generated by the I/Q modulator 15y. The polarization beam multiplexed optical signal is transmitted to an optical receiver through an optical transmission path (transmission line) 17. One or a plurality of optical amplifiers may be provided in the optical transmission path 17.

Figure 2:
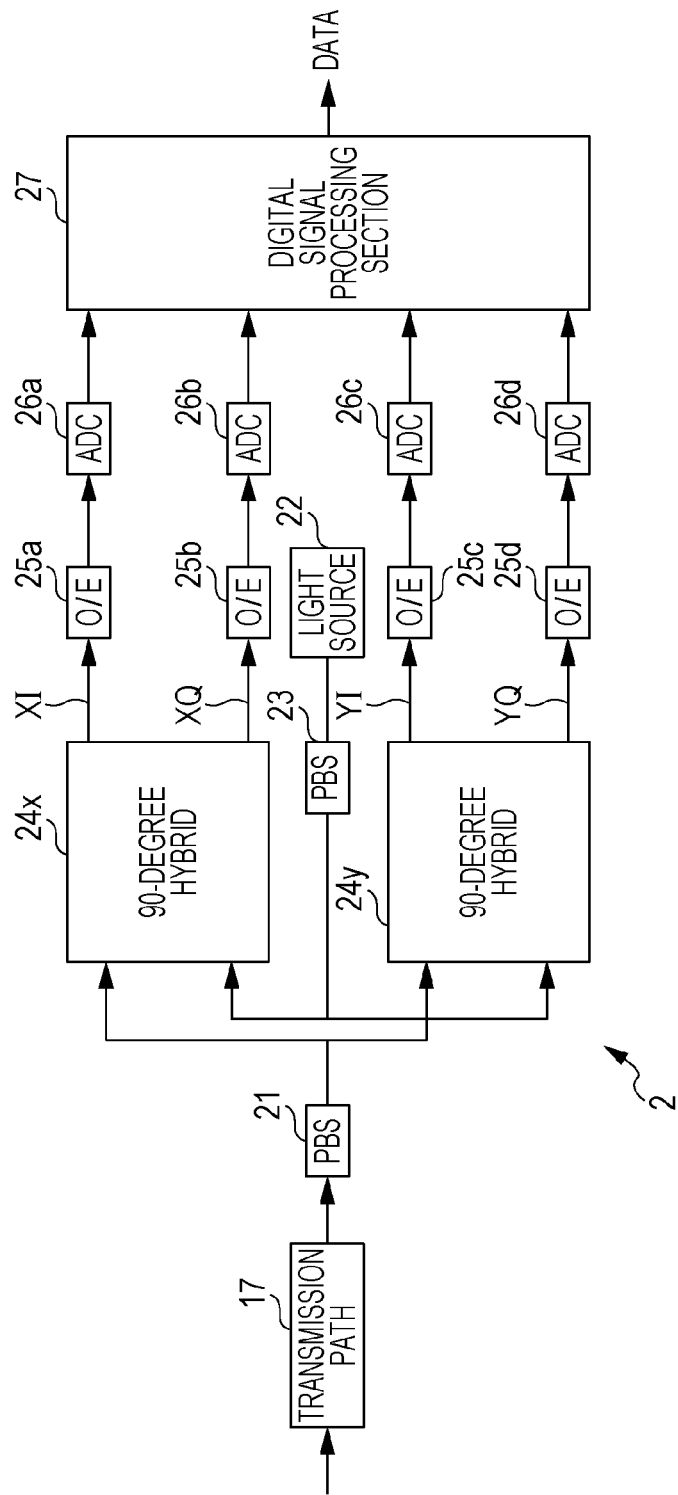
FIG. 2 is a diagram illustrating an example of an optical receiver.

FIG. 2 is a diagram illustrating an example of an optical receiver. An optical receiver 2 includes a polarization beam splitter (PBS) 21, a local light source 22, a PBS 23, 90-degree optical hybrid circuits 24x and 24y, optical-to-electrical (O/E) converters 25a to 25d, analog-to-digital converters (ADC) 26a to 26d, and a digital signal processing section 27. The PBS 21, the local light source 22, the PBS 23, the 90-degree optical hybrid circuits 24x and 24y, and the O/E converters 25a to 25d constitute a receiver front-end circuit 20. The optical receiver 2 receives a polarization beam multiplexed optical signal transmitted from the optical transmitter 1 illustrated in FIG. 1.

The PBS 21 separates the received polarization beam multiplexed optical signal into optical signals X and Y orthogonal to each other, and leads the separated optical signals X and Y respectively to the 90-degree optical hybrid circuits 24x and 24y. The local light source 22 generates a local light having a prescribed frequency. In the example, the local light is a continuous light. The frequency of the light source 14 (that is, a carrier frequency) is substantially the same as the frequency of the local light source 22. The PBS 23 separates the local light generated by the local light source 22 into local lights X and Y orthogonal to each other, and leads the separated local lights X and Y respectively to the 90-degree optical hybrid circuits 24x and 24y.

The 90-degree optical hybrid circuit 24x obtains I and Q components (XI and XQ) of the optical signal X using the local light X. Similarly, the 90-degree optical hybrid circuit 24y obtains I and Q components (YI and YQ) of the optical signal Y using the local light Y. The O/E converters 25a, 25b, 25c, and 25d respectively convert the optical signal components XI, XQ, YI, and YQ into electrical signals. The ADCs 26a, 26b, 26c, and 26d respectively convert the electrical signals XI, XQ, YI, and YQ into digital signals. The digital signal XI, XQ, YI, and YQ indicate pieces of electric field information of the received polarization beam multiplexed optical signal. That is, the receiver front-end circuit 20 generates pieces of electric field information of the received polarization beam multiplexed optical signal by coherent reception. In addition, the digital signal processing section 27 regenerates data from the electric field information (that is, the digital signals XI, XQ, YI, and YQ) of the received polarization beam multiplexed optical signal.

Figure 3:
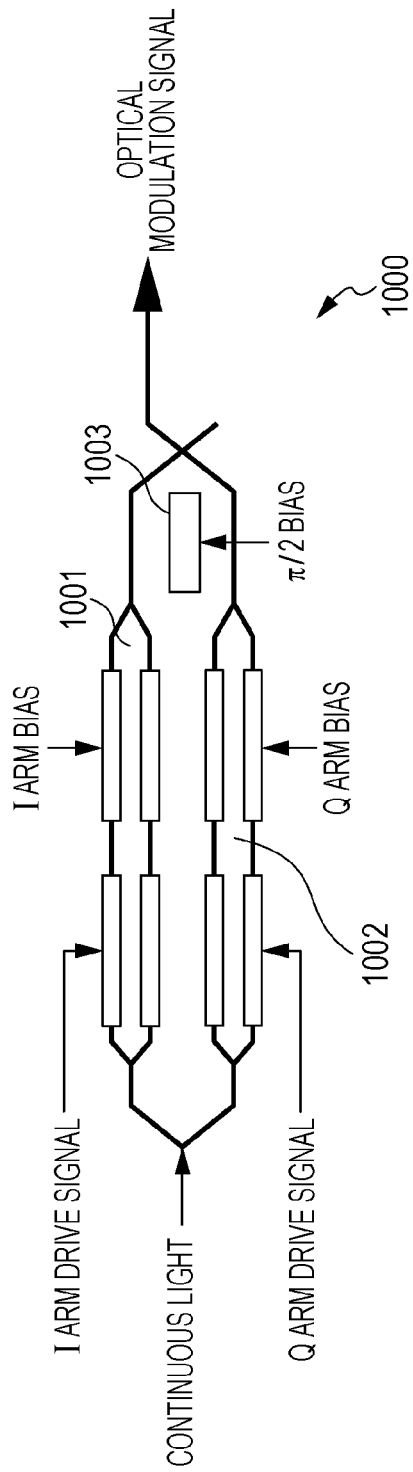
FIG. 3 is a diagram illustrating a configuration of an I/Q modulator.

Each of the I/Q modulators (15x and 15y in FIG. 1) are obtained, for example, by the Mach-Zehnder interferometer illustrated in FIG. 3. In the example illustrated in FIG. 3, the I/Q modulator 1000 includes an I arm modulator 1001, a Q arm modulator 1002, and a phase shifter 1003. To the I arm modulator 1001, an I arm drive signal and an I arm bias voltage are applied. To the Q arm modulator 1002, a Q arm drive signal and a Q arm bias voltage are applied. For example, in the I/Q modulator 15x, the drive signal XI is applied to the I arm modulator 1001 as the I arm drive signal, and the drive signal XQ is applied to the Q arm modulator 1002 as the Q arm drive signal. Similarly, in the I/Q modulator 15y, the drive signal YI is applied to the I arm modulator 1001 as the I arm drive signal, and the drive signal YQ is applied to the Q arm modulator 1002 as the Q arm drive signal. The phase shifter 1003 applies a prescribed optical phase difference (for example, $\pi/2$) between the I arm and the Q arm.

The continuous light having the prescribed frequency is input to the I/Q modulator 1000. The continuous light is divided and led to the I arm modulator 1001 and the Q arm modulator 1002. The I arm modulator 1001 modulates the continuous light using the I arm drive signal, and the Q arm modulator 1002 modulates the continuous light using the Q arm drive signal. In addition, the I/Q modulator 1000 combines the optical signal generated by the I arm modulator 1001 with the optical signal generated by the Q arm modulator 1002, and performs output of the obtained optical modulation signal.

Figure 4:
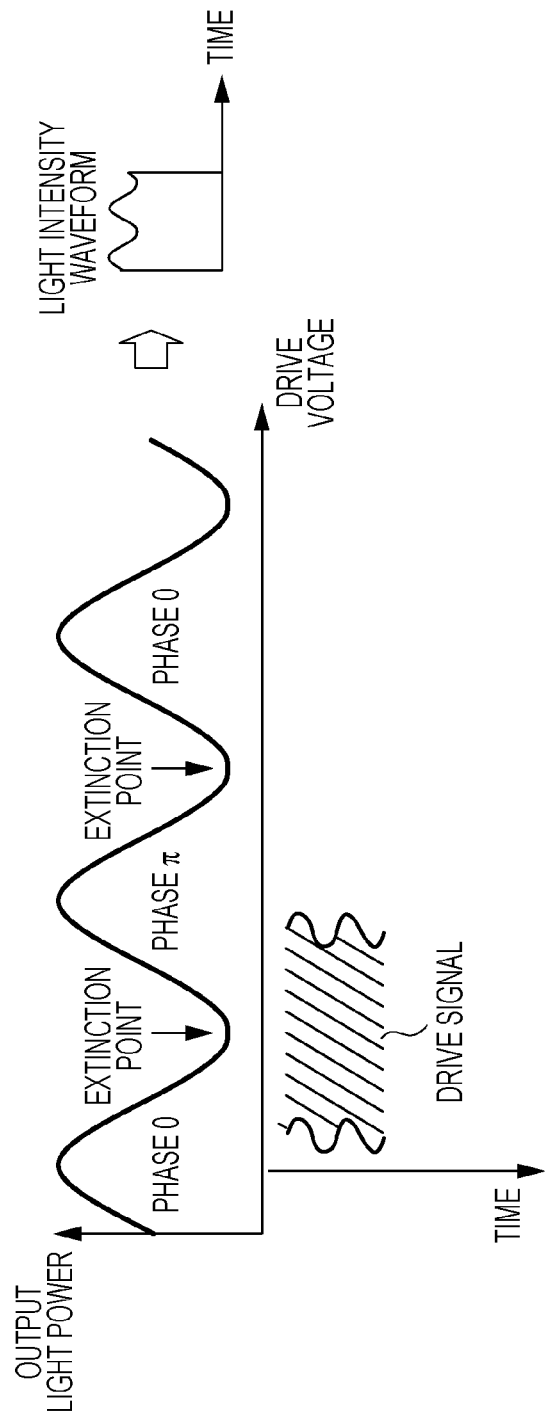
FIG. 4 is a diagram illustrating characteristics of the I/Q modulator.

As illustrated in FIG. 4, the output light power of each of the modulators (I arm modulator 1001 and Q arm modulator 1002) is periodically changed for the applied voltage. Hereinafter, a point at which the output light power of the modulator is minimized may be referred to "extinction point".

As illustrated in FIG. 4, each of the drive signals (I arm drive signal and Q arm drive signal) is applied to the modulator so that the center of the drive signal waveform is matched with the extinction point when modulation (for example, phase modulation) in which transmission of information is performed using information on the amplitude and the phase of the optical signal electric field is performed. Such an operation state is achieved by controlling bias voltage (I arm bias voltage and Q arm bias voltage) applied to the modulators. In a case of an intensity modulation scheme in which transmission of information is performed using only the intensity of the optical signal, there is a case in which the bias voltage is controlled at voltage that does not correspond to the extinction point, but in the following description, a modulation scheme in which the bias voltage is controlled at the extinction point. Hereinafter, the center of the drive signal waveform may be referred to as "operation point". A method in which the bias of each arm of an I/Q modulator is controlled is discussed, for example, in Japanese Laid-Open Patent Publication No. 2000-162563. A method in which the bias of a $\pi/2$ phase shifter of an I/Q modulator is controlled is discussed, for example, in Japanese Laid-Open Patent Publication No. 2007-082094.

Figure 5:
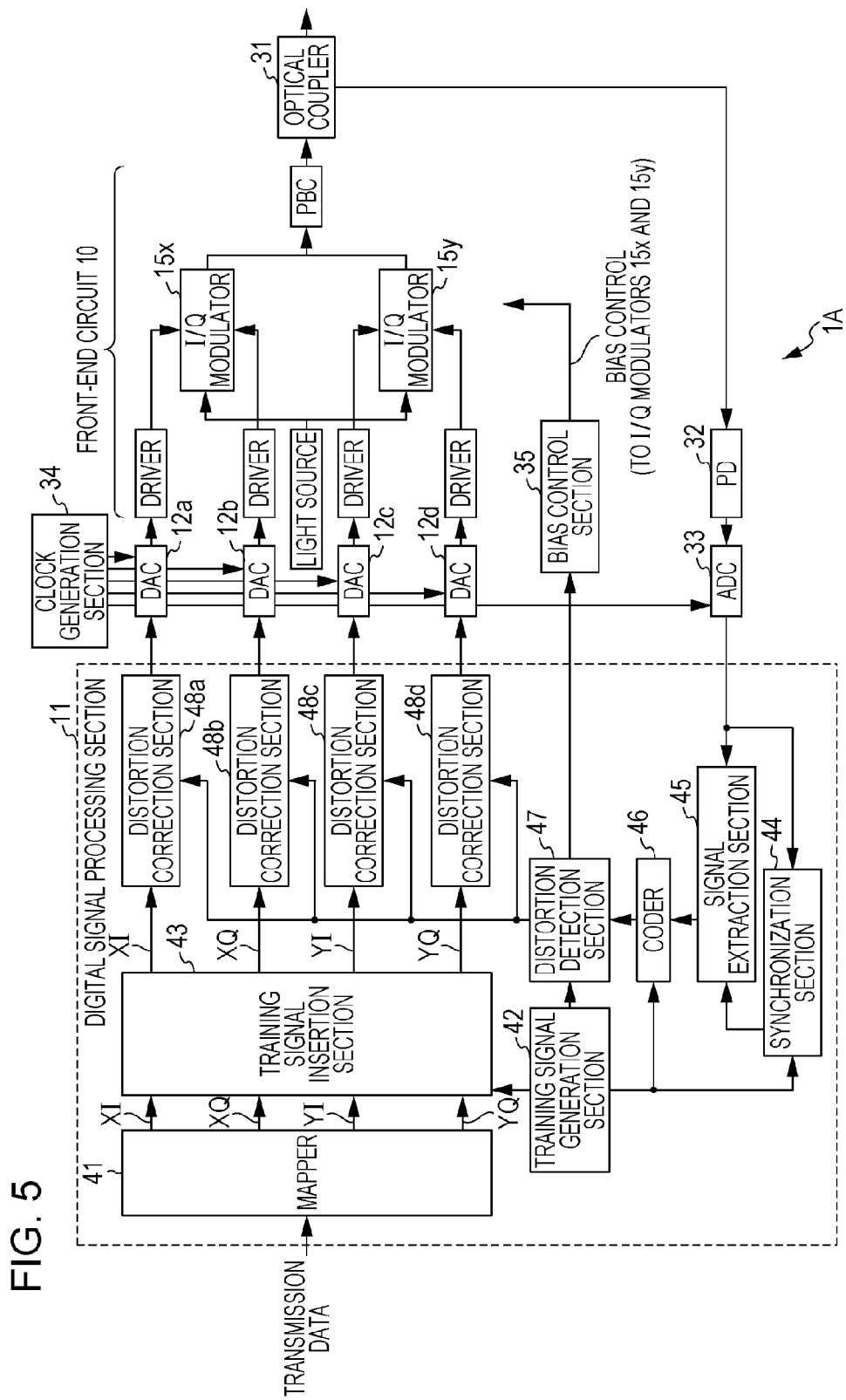
FIG. 5 is a diagram illustrating an example of a configuration of an optical transmitter according to an embodiment.

FIG. 5 is a diagram illustrating an example of a configuration of an optical transmitter according to an embodiment. As illustrated in FIG. 5, an optical transmitter 1A according to the embodiment includes a transmitter front-end circuit 10, a digital signal processing section 11, DACs 12a to 12d, an optical coupler 31, an optical receiver 32, an ADC 33, a clock generator 34, and a bias control section 35.

The configuration and the operation of the transmitter front-end circuit 10 is described above with reference to FIG. 1. That is, the transmitter front-end circuit 10 generates a polarization beam multiplexed optical signal based on electric field information signals XI, XQ, YI, and YQ generated by the digital signal processing section 11. For example, drive signals XI, XQ, YI, and YQ are respectively generated from the electric field information signals XI, XQ, YI, and YQ. In addition, the I/Q modulator 15x generates an optical modulation signal X by modulating a continuous light using the drive signals X (XI and XQ). The I/Q modulator 15y generates an optical modulation signal Y by modulating the continuous light using the drive signals Y (YI and YQ). In addition, the PBC 16 generates a polarization beam multiplexed optical signal by combining the optical modulation signal X generated by the I/Q modulator 15x with the optical modulation signal Y generated by the I/Q modulator 15y.

The optical coupler 31 is used as an optical splitter, and branches the polarization beam multiplexed optical signal generated by the transmitter front-end circuit 10, and leads the branched signal to the optical receiver 32. The optical receiver (PD) 32 generates an intensity signal indicating the intensity of the polarization beam multiplexed optical signal (that is, the optical modulation signals generated by the I/Q modulators 15x and 15y) generated by the transmitter front-end circuit 10 by direct detection. The optical receiver 32 includes a photodiode used to convert an optical signal into an electrical signal. The ADC 33 converts the intensity signal generated by the optical receiver 32, into a digital signal.

The clock generator 34 generates a clock signal used in the DACs 12a to 12d and the ADC 33. It is desirable that the sample rate of the ADC 33 is equal to or more than a baud rate of the transmission signal. The detail is described below, but the sampling rate may be caused to become the baud rate or less by adjusting the training signal. However, in this case, there is a possibility that the performance is reduced. In the following description, it is assumed below that the sampling rate of the ADC is the baud rate or more.

The bias control section 35 controls the bias of each of the I/Q modulators 15x and 15y. The bias control of the I/Q modulator includes control of the bias voltage of the I arm modulator 1001, control of the bias voltage of the Q arm modulator 1002, and control of the bias voltage of the phase shifter 1003 illustrated in FIG. 3. The bias voltage of the I arm modulator 1001 is controlled so that the operation point of the I arm modulator 1001 gets close to one of the extinction points illustrated in FIG. 4. Similarly, the bias voltage of the Q arm modulator 1002 is controlled so that the operation point of the Q arm modulator 1002 is close to one of the extinction points illustrated in FIG. 4. The bias voltage of the phase shifter 1003 is controlled so that a phase difference between the I arm and the Q arm is close to a target value (for example, $\pi/2$).

The digital signal processing section 11 includes a mapper 41, a training signal generation section 42, a training signal insertion section 43, a synchronization section 44, a signal extraction section 45, a coder 46, a distortion detection section 47, and distortion correction sections 48a to 48d. The digital signal processing section 11 may include a further function that is not illustrated in FIG. 5. In addition, the training signal generation section 42, the synchronization section 44, the signal extraction section 45, the coder 46, and the distortion detection section 47 may be obtained by a further digital signal processing circuit different from the digital signal processing section 11.

The mapper 41 generates electric field information signals from the transmission data that has been input to the transmitter. The electric field information indicates the amplitude and phase of an optical modulation signal generated in the transmitter front-end circuit 10. That is, the mapper 41 generates electric field information signals EX (XI and XQ) corresponding to data transmitted using an X polarization beam and generates electric field information signals EY (YI and YQ) corresponding to data transmitted using a Y polarization beam. The electric field information signal may be indicated by the following complex number. Here, "EX=XI+jXQ", and "EY=YI+jYQ" are satisfied.

The training signal generation section 42 generates a training signal used to detect waveform distortion of the optical modulation signal. The training signal insertion section 43 inserts the training signal generated by the training signal generation section 42 into the electric field information signals XI, XQ, YI, and YQ generated by the mapper 41. The training signal is stored in a frame as described later.

When the training signal is inserted into the electric field information signals, each of the optical modulation signals generated by the I/Q modulators 15x and 15y includes a training signal component. Therefore, the intensity signal generated by the optical receiver 32 also includes the training signal component. In addition, the intensity signal including the training signal component is converted into a digital signal, and is input to the digital signal processing section 11.

The synchronization section 44 searches the intensity signal generated by the optical receiver 32 for a training signal, using the training signal generated by the training signal generation section 42. Hereinafter, such as an operation is referred to as frame synchronization. That is, the synchronization section 44 detects the position into which the training signal is inserted in the intensity signal. The signal extraction section 45 extracts a signal component corresponding to the training signal (that is, signal indicating the intensity of the training signal) from the intensity signal, in accordance with the detection result by the synchronization section 44. Hereinafter, the signal component corresponding to the training signal extracted from the intensity signal may be referred to as "intensity training signal".

The coder 46 generates a coded training signal by coding the intensity training signal that has been extracted by the signal extraction section 45, using the training signal generated by the training signal generation section 42. The coding of the training signal by the coder 46 is described later. The distortion detection section 47 detects waveform distortion of the optical modulation signal, based on the coded training signal generated by the coder 46.

The distortion correction sections 48a, 48b, 48c, and 48d respectively corrects the electric field information signals XI, XQ, YI, and YQ in accordance with the waveform distortion of the optical modulation signal detected by the distortion detection section 47. For example, the distortion correction section 48a corrects the electric field information signal XI in accordance with the waveform distortion detected by the distortion detection section 47 so that the waveform distortion of the optical signal generated in the I arm of the I/Q modulator 15x is reduced. Similarly, the distortion correction sections 48b, 48c, and 48d also respectively correct the electric field information signals XQ, YI, and YQ so that the waveform distortion of the optical signal generated in the corresponding arm of the corresponding I/Q modulator is reduced. The distortion correction sections 48a, 48b, 48c, and 48d are not particularly limited, but for example, obtained by a digital filter such as a FIR filter. In addition, the bias control section 35 may control the bias of the I/Q modulators 15x and 15y, in accordance with the waveform distortion of the optical modulation signal detected by the distortion detection section 47.

Figure 6:
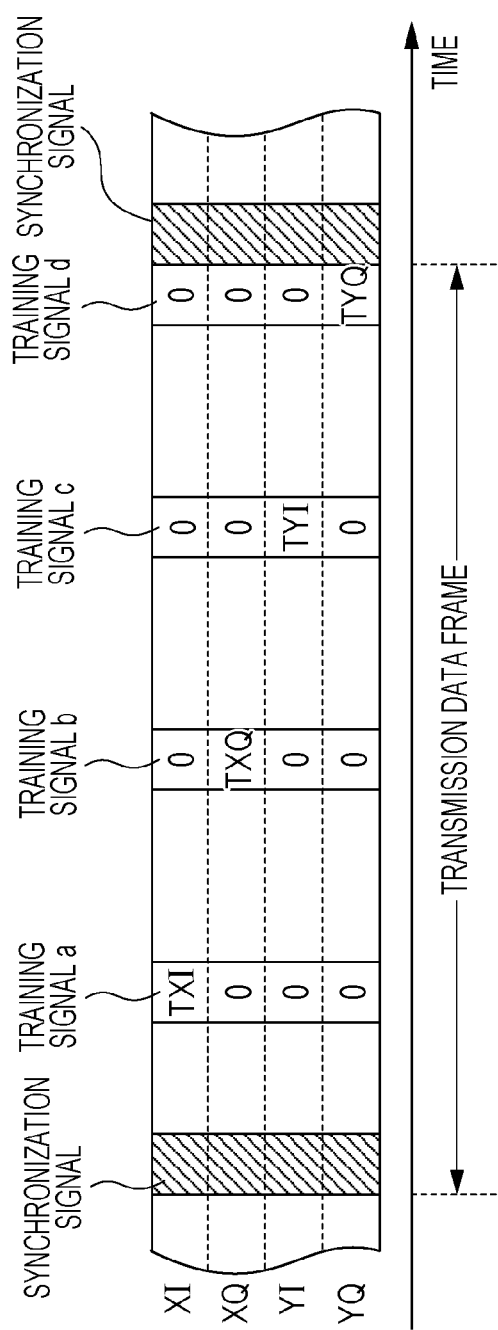
FIG. 6 is a diagram illustrating an example of transmission data into which training signals are inserted.

FIG. 6 is a diagram illustrating an example of transmission data into which training signals have been inserted. Hereinafter, transmission data into which training signals have been inserted is referred to as a transmission data frame. Here, a transmission data frame is indicated by the electric field information signals XI, XQ, YI, and YQ.

The training signals generated by the training signal generation section 42 include synchronization signals and training signals a to d. The synchronization signal is used for frame synchronization in the synchronization section 44.

Here, the synchronization section 44 performs frame synchronization by detecting a synchronization signal from the intensity signal indicating the intensity of the optical signal. Therefore, the synchronization signals are generated so that optical signals used to perform transmission of the synchronization signals have a plurality of different intensity levels.

The training signals a to d are respectively used to detect distortion of the channels XI, XQ, YI, and YQ. Therefore, when distortion of a certain channel is detected, training signals of the other channels are set at zero. For example, the training signal a is used to detect distortion of the channel XI (I arm of the I/Q modulator 15x), so that a distortion detection signal TXI is inserted into the electric field information signal XI, and "zero" is inserted into the electric field information signals XQ, YI, and YQ. The distortion detection signals TXI, TXQ, TYI, and TYQ may be the same as each other, or may not be the same as each other. In addition, the transmission data frame illustrated in FIG. 6 is an example. For example, the synchronization signals, and the distortion detection signals TXI to TYQ may be inserted into the beginning of the transmission data, as a continuous signal column.

Figure 7:
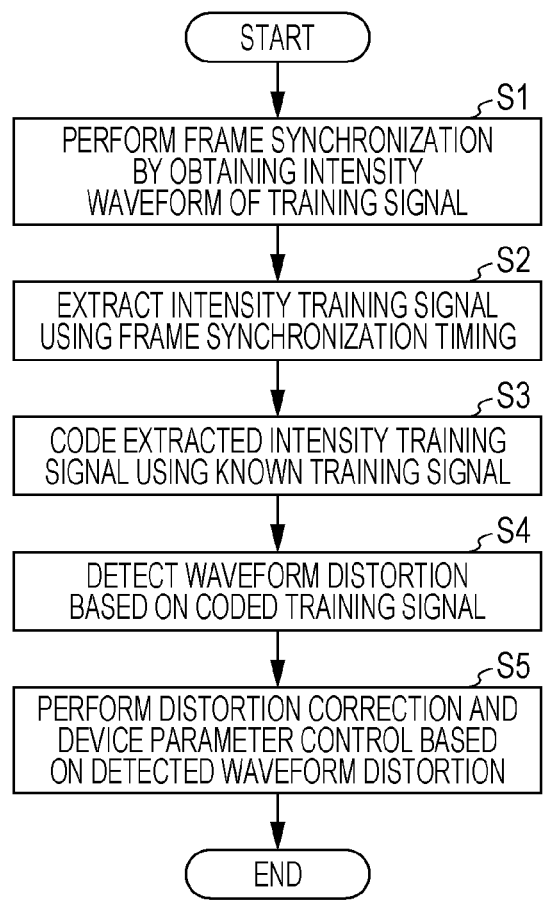
FIG. 7 is a flowchart illustrating processing in which waveform distortion is detected and corrected.

FIG. 7 is a flowchart illustrating processing in which waveform distortion is detected and corrected. The processing of the flowchart is executed, for example, for the channels XI, XQ, YI, and YQ. That is, pieces of waveform distortion of the channels XI, XQ, YI, and YQ are corrected in order by a time division scheme. The training signals illustrated in FIG. 6 are respectively inserted into the electric field information signals XI, XQ, YI, and YQ.

In S1, the synchronization section 44 performs frame synchronization by searching for an intensity signal generated by the optical receiver 32. That is, the synchronization section 44 detects the positions into which the training signals a to d are inserted in the intensity signal.

In S2, the signal extraction section 45 extracts an intensity training signal corresponding to the training signal from the intensity signal, using the frame synchronization timing detected by the synchronization section 44. For example, when waveform distortion of the channel XI is corrected, the signal extraction section 45 extracts an intensity training signal corresponding to the training signal a illustrated in FIG. 6 from the intensity signal.

In S3, the coder 46 generates a coded training signal by coding the intensity training signal that has been extracted by the signal extraction section 45 using the training signal generated by the training signal generation section 42. In S4, the distortion detection section 47 detects waveform distortion of the optical modulation signal, based on the coded training signal generated by the coder 46. In this case, the distortion detection section 47 may detect the waveform distortion of the optical modulation signal by comparing the training signal generated by the training signal generation section 42 with the coded training signal generated by the coder 46.

In S5, the waveform distortion is corrected based on the waveform distortion detected by the distortion detection section 47. That is, the distortion correction sections 48a, 48b, 48c, and 48d respectively correct the electric field information signals XI, XQ, YI, and YQ in accordance with the waveform distortion detected by the distortion detection section 47. For example, when the waveform distortion of the channel XI is corrected, the distortion correction section 48a corrects the electric field information signal XI, in accordance with the waveform distortion detected by the distortion detection section 47.

In the specification, it is assumed that "correction of the waveform distortion" includes processing in which a parameter of a device in the optical transmitter is controlled. That is, in S5, the bias control section 35 may control bias of the I/Q modulators 15x and 15y (I arm bias, Q arm bias, and π/2 phase shifter bias), based on the waveform distortion that has been detected by the distortion detection section 47.

Frame-Synchronization

As described above, the training signal insertion section 43 inserts the training signals including the synchronization signals into the electric field information signals. In addition, the synchronization section 44 performs frame synchronization by detecting the synchronization signals from the intensity signal generated by the optical receiver 32.

Figure 8A:
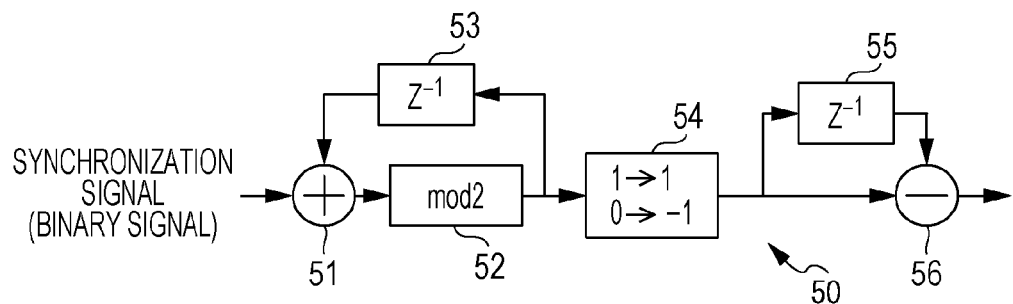
FIGS. 8A, 8B, and 8C are diagrams illustrating frame synchronization.
Figure 8B:
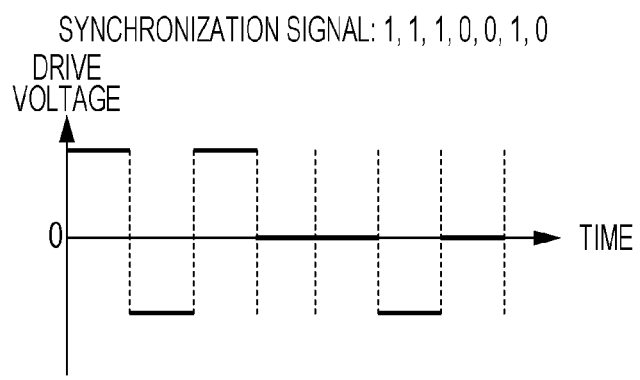
Figure 8C:
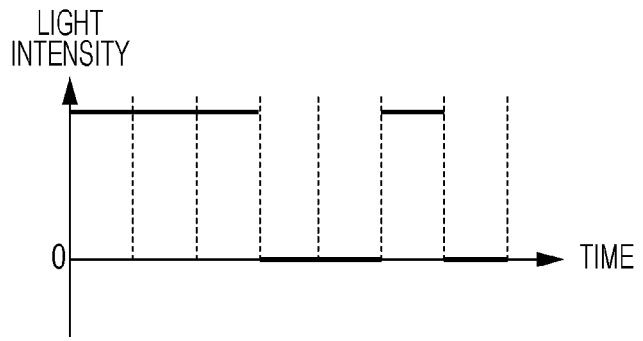

FIGS. 8A, 8B, and 8C are diagrams illustrating frame synchronization for extraction of a training signal. The frame synchronization is performed using the synchronization signals in the training signals. The synchronization signal is generated, for example, by a synchronization signal generation circuit 50 illustrated in FIG. 8A. The synchronization signal generation circuit 50 is provided, for example, in the training signal generation section 42.

The synchronization signal generation circuit 50 includes an adder 51, a modulo arithmetic section 52, a delay element 53, a converter 54, a delay element 55, and a subtractor 56. In addition, a binary signal indicating a synchronization signal is applied to the synchronization signal generation circuit 50. In the example illustrated in FIG. 8A, a binary signal "1110010" is applied to the synchronization signal generation circuit 50.

The adder 51 adds an output signal of the delay element 53 to the input binary signal, for each of the bits. The modulo arithmetic section 52 divides the output signal of the adder 51 by two and performs of output of "remainder", for each of the bits. Thus, the output of the modulo arithmetic section 52 is 1 or 0. The delay element 53 delays the output single of the modulo arithmetic section 52 by one bit and applies the output single to the adder 51. The converter 54 performs the following conversion on the output signal of the modulo arithmetic section 52, for each of the bits.

(1) "1" is output when "1" is input.

(2) "−1" is output when "0" is input. The delay element 55 delays the output signal of the converter 54 by one bit and applies the signal to the subtractor 56. The subtractor 56 subtracts the output signal of the delay element 55 from the output signal of the converter 54, for each of the bits.

When the binary signal "1110010" is applied to the synchronization signal generation circuit 50 having the above-described configuration, a calculation result "2, −2, 2, 0, 0, −2, 0" is obtained. That is, the transmission waveform illustrated in FIG. 8B is generated. Here, the synchronization signal output from the synchronization signal generation circuit 50 is converted into an analog signal by the DAC, is converted into a drive signal by the driver, and then applied to the corresponding arms in the corresponding I/Q modulator 15x or 15y. That is, a value of each of the bits of the synchronization signal output from the synchronization signal generation circuit 50 indicates voltage of the drive signal applied to the corresponding arm of the corresponding I/Q modulator 15x or 15y. Therefore, an absolute value of the value of each of the bits of the synchronization signal output from the synchronization signal generation circuit 50 corresponds to the amplitude of the optical signal. Here, "drive voltage=0" illustrated in FIG. 8B indicates, for example, voltage corresponding to the extinction point illustrated in FIG. 4. Here, the value indicating the calculation result of the synchronization signal generation circuit 50 is adjusted in accordance with the amplitude of a data signal, at the time of insertion of a synchronization signal.

FIG. 8C is a diagram illustrating the intensity of the optical signal generated by the synchronization signal illustrated in FIG. 8B. The intensity of the optical signal is proportional to the square of the amplitude of the optical signal. Here, the amplitude of the first to third bits and the sixth bit is "2", and the amplitude of the fourth bit, the fifth bit, and the seventh bit is zero. Therefore, when the optical signal is generated by the synchronization signal illustrated in FIG. 8B, the light intensity of the first to third bits and the sixth bit is a prescribed intensity that is not zero, and the light intensity of the fourth bit, the fifth bit, and the seventh bit is practically zero. Therefore, the binary signal "1110010" that has been applied to the synchronization signal generation circuit 50 is regenerated by determining whether the light intensity is larger than a prescribed threshold value. Thus, the synchronization section 44 may detect the head of the frame by searching for timing having high correlation with the binary signal "1110010" in the intensity signal generated by the optical receiver 32.

As described above, the intensity of the optical signal indicating the synchronization signal is not fixed, and is changed depending on a bit pattern of the synchronization signal. Therefore, the synchronization section 44 may detect the synchronization signal that has been inserted into the electric field information signal by monitoring a change in the intensity of the optical signal. That is, the frame synchronization may be established by directly detecting the intensity of the optical signal using the single optical receiver 32. The configuration and the operation for the frame synchronization are the same between first to fourth embodiments described below.

The synchronization signal illustrated in FIGS. 8A and 8B is merely an example, and the embodiment is not limited to such an example. For example, the synchronization signal may be generated using pulse amplitude waveform modulation. In the embodiment, it is assumed that an identical synchronization signal is inserted into each of the channels XI, XQ, YI, and Y.

First Embodiment

In the first embodiment, the waveform distortion of each of the channels XI, XQ, YI, and YQ is individually corrected. That is, in the first embodiment, waveform distortion independently generated in each of the channels XI, XQ, YI, and YQ is corrected. For example, waveform distortion generated so as to be caused by the following factors is corrected.

(1) Nonlinearity of a driver or an I/Q modulator, or harmonic distortion (2) Skew of a drive signal of an I/Q modulator (3) Lack of an analog bandwidth of a DAC, a driver, an I/Q modulator, or wiring (substrate, cable, connector, or the like)

Figure 9:
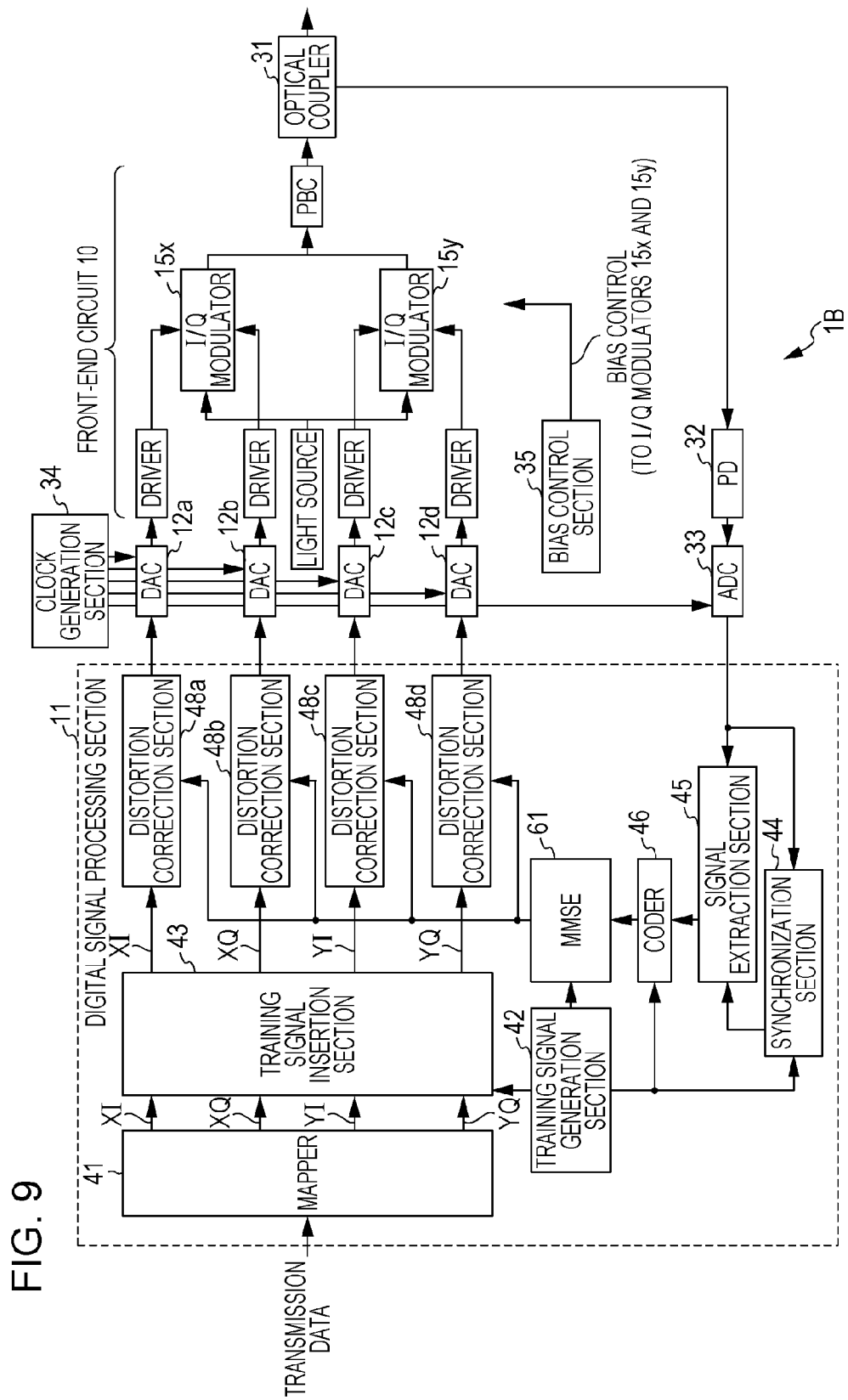
FIG. 9 is a diagram illustrating an example of a configuration of the optical transmitter according to the first embodiment.

FIG. 9 is a diagram illustrating an example of a configuration of an optical transmitter according to the first embodiment. An optical transmitter 1B according to the first embodiment includes a minimum mean square error (MMSE) calculation circuit 61 that performs calculation of an MMSE algorithm used to determine a distortion correction value so that an error between a training signal and a reception signal is minimized, as an example of the distortion detection section 47. In addition, the bias control section 35 may control bias of the I/Q modulators 15x and 15y without consideration of the waveform distortion detected using the training signal.

In the optical transmitter 1B having the above-described configuration, the training signal generation section 42 generates the training signal illustrated in FIG. 6, and the training signal insertion section 43 inserts the training signal into the electric field information signal generated by the mapper 41. Therefore, the front-end circuit 10 including the I/Q modulators 15x and 15y generates a polarization beam multiplexed optical signal in accordance with the electric field information signals into which the training signals have been inserted.

The optical receiver 32 generates an intensity signal by converting the polarization beam multiplexed optical signal transmitted from the front-end circuit 10, into an electrical signal. The ADC 33 converts the intensity signal into a digital signal. The signal extraction section 45 extracts an intensity training signal corresponding to the training signal, from the digitalized intensity signal, using synchronization timing obtained by the synchronization section 44. The coder 46 generates a coded training signal by coding the intensity training signal that has been extracted by the signal extraction section 45. In addition, the MMSE calculation circuit 61 calculates a correction value of the distortion correction section so that an MMSE between the coded training signal generated by the coder 46 and the training signal generated by the training signal generation section 42 using the MMSE algorithm.

The distortion correction sections 48a to 48d respectively correct the electric field information signals XI, XQ, YI, and YQ, based on the detected waveform distortion. For example, the distortion correction sections 48a to 48d respectively correct the electric field information signals XI, XQ, YI, and YQ using the correction value obtained by the MMSE calculation circuit 61.

A waveform distortion correction method in the first embodiment is described below in detail. In the following description, a case is described in which waveform distortion in the I arm (that is, the channel XI) of the I/Q modulator 15x is corrected. An operation in which waveform distortion of the other channels XQ, YI, and YQ is corrected is practically the same as the operation in which the waveform distortion of the channel XI is corrected.

When the waveform distortion in the channel XI is corrected, the training signal a illustrated in FIG. 6 is used. As described above, the training signal a is constituted by the distortion detection signal TXI inserted into the electric field information signal XI and "zero" inserted into the electric field information signals XQ, YI, and YQ. Thus, when the training signal a is output from the digital signal processing section 11, the front-end circuit 10 outputs an optical signal indicating the distortion detection signal TXI.

Figure 10A:
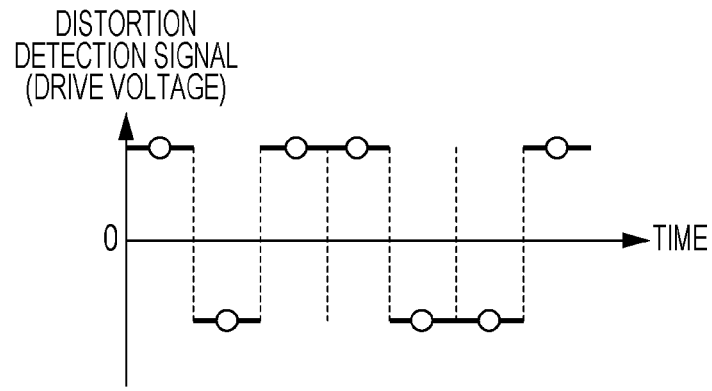
FIGS. 10A, 10B, and 10C are diagrams illustrating a waveform distortion correction method according to a first embodiment.

FIG. 10A is a diagram illustrating an example of the training signal (that is, distortion detection signal TXI) inserted into an electric field information signal XI. In the embodiment, the distortion detection signal TXI is a binary signal constituted by a first value and a second value. The first value is a positive value, and the second value is a negative value. In addition, absolute values of the first value and the second value are the same as each other. As an example, the distortion detection signal TXI is a binary signal constituted by "1" and "−1". "Drive voltage=0" illustrated in FIG. 10A corresponds to a state in which the optical modulator operates at the extinction point illustrated in FIG. 4.

Figure 10B:
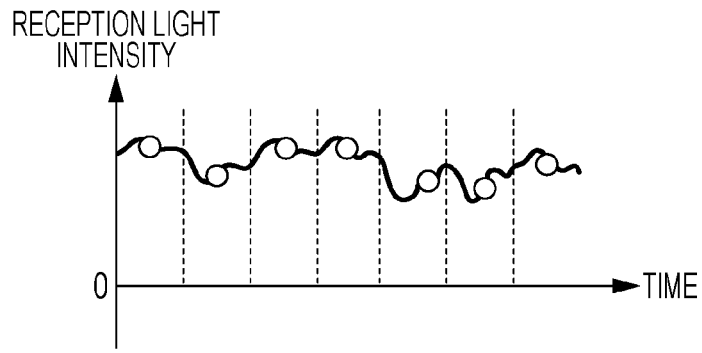

FIG. 10B is a diagram illustrating the intensity of the optical signal when the training signal a has been output from the digital signal processing section 11. As described above, the intensity of the optical signal is detected by the optical receiver 32. That is, the optical receiver 32 generates an intensity signal indicating the intensity of the optical signal. The intensity signal is converted into a digital signal by the ADC 33. The circle illustrated in FIG. 10B indicates the sampling point of the ADC 33. In addition, the digitalized intensity signal is extracted by the signal extraction section 45 and led to the coder 46.

The coder 46 generates an amplitude information signal by calculating a square root of the intensity signal that has been extracted by the signal extraction section 45, for each of the bits. The intensity of the optical signal is proportional to the square of the amplitude of the optical signal. Therefore, the square root of the intensity signal (that is, amplitude information signal) practically indicates the amplitude of the optical signal. However, the processing in which the square root of the intensity signal is calculated may not be desired, and the intensity signal may be regarded as an amplitude information signal as is.

After that, the coder 46 generates a coded training signal by coding the amplitude information signal using the training signal (that is, distortion detection signal) generated by the training signal generation section 42. In this case, a positive sign or a negative sign is applied to each of corresponding bits of the amplitude information signal, based on a positive sign or a negative sign of each of the bits of the distortion detection signal. For example, the sign of the first bit of the distortion detection signal is "positive", so that "positive" is applied to the first bit of the amplitude information signal. In this case, the value of the first bit of the amplitude information signal is not changed. On the contrary, the sign of the second bit of the distortion detection signal is "negative", so that "negative" is applied to the second bit of the amplitude information signal. In this case, the sign of the second bit of the amplitude information signal is inverted. As described above, the amplitude information signal is coded based on the positive sign or the negative sign of each of the bits of the distortion detection signal. Therefore, it is desirable that the value of each of the bits of the distortion detection signal is not zero.

Figure 10C:
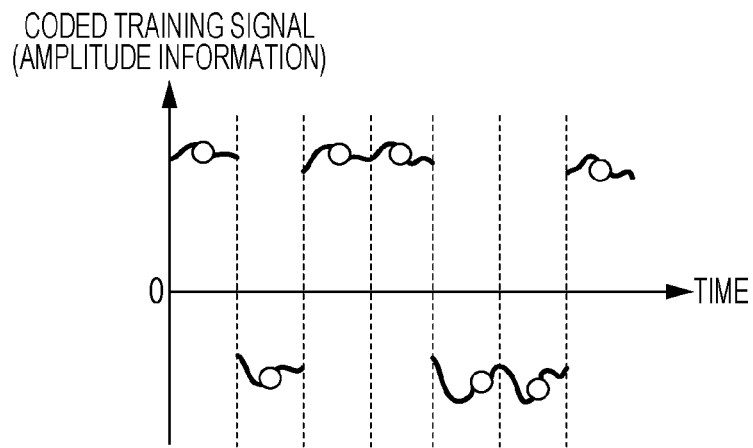

FIG. 10C is a diagram illustrating the coded training signal generated by the coder 46. In the embodiment, the first bit, the third bit, the fourth bit, and the seventh bit of the distortion detection signal are "positive", so that the first bit, the third bit, the fourth bit, and the seventh bit of the coded training signal are also "positive". In addition, the second bit, the fifth bit, and the sixth bit of the distortion detection signal are "negative", so that the second bit, the fifth bit, and the sixth bit of the coded training signal are also "negative". An absolute value of each of the bits of the coded training signal indicates the amplitude of the optical signal.

The MMSE calculation circuit 61 calculates a correction value so that an error between the distortion detection signal illustrated in FIG. 10A and the coded training signal illustrated in FIG. 10C become minimum. In this case, the MMSE calculation circuit 61 may execute the MMSE algorithm after normalizing the distortion detection signal and the coded training signal. Here, when it is assumed that there is no waveform distortion in the XI channel, the distortion detection signal and the coded training signal are substantially the same, so that the error is to become practically zero. In addition, when waveform distortion is generated in the XI channel, the coded training signal is distorted for the distortion detection signal, and the error becomes a value corresponding to the waveform distortion. That is, when the signal of the XI channel is corrected so that the error becomes close to zero, the waveform distortion of the XI channel is suppressed or compensated. As described above, the error between the distortion detection signal and the coded training signal indicates the waveform distortion of the optical signal.

Therefore, the MMSE calculation circuit 61 generates a control signal used to control the operation of the distortion correction section 48a, based on the calculated error (that is, the detected waveform distortion). For example, when the distortion correction section 48a is obtained by a FIR filter, the control signal includes a coefficient of each tap of the FIR filter. In this case, the coefficient of the FIR filter is determined so that the waveform distortion of the XI channel is suppressed or compensated. For example, the MMSE algorithm may be obtained from a normal equation constituted by an autocorrelation matrix of the reception signal and a cross-correlation matrix of the reception signal and the training signal. Thus, when the distortion correction section 48a corrects the electric field information signal in accordance with the coefficient, the waveform distortion of the optical signal generated in the I arm of the I/Q modulator 15x is corrected.

Figure 11:
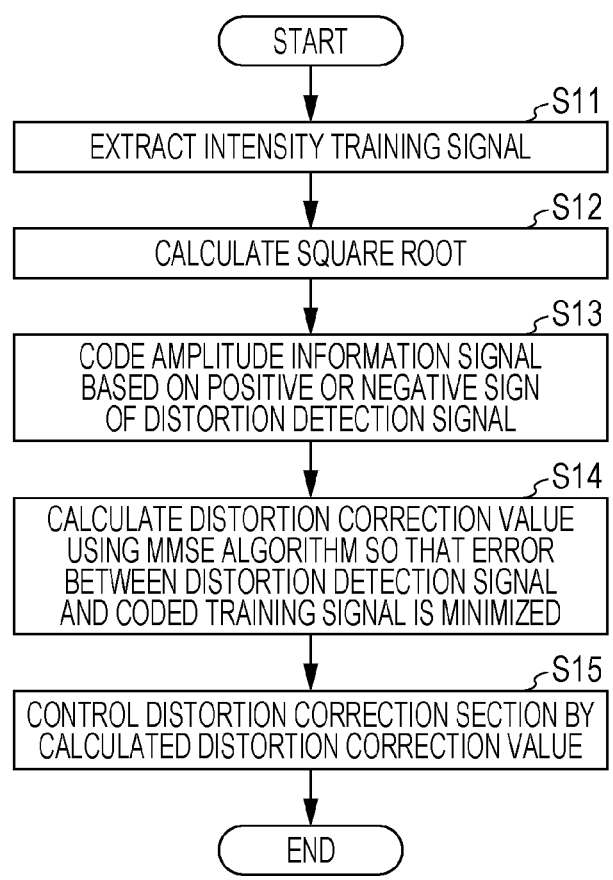
FIG. 11 is a flowchart illustrating waveform distortion correction processing according to the first embodiment.

FIG. 11 is a flowchart illustrating waveform distortion correction processing according to the first embodiment. The processing of the flowchart is executed for each of the channels XI, XQ, YI, and YQ. In addition, it is assumed that the training signal insertion section 43 repeatedly inserts the training signal illustrated in FIG. 6 into electric field information signal.

In S11, the signal extraction section 45 extracts a signal component corresponding to the training signal (that is, the intensity training signal) from the intensity signal. In S12, the coder 46 generates an amplitude information signal by calculating a square root of each of the bits of the extracted intensity training signal. As described above, the square root processing may not be desired. In S13, based on a positive sign or a negative sign of each of the bits of the distortion detection signal generated by the training signal generation 42, the coder 46 codes each of corresponding bits of the amplitude information signal. In S14, the MMSE calculation circuit 61 determines a distortion correction value so that an error between the distortion detection signal and the coded training signal becomes minimum, using the MMSE algorithm, and in S15, the distortion correction section is controlled by the above-described correction value.

As described above, in the first embodiment, using information indicating the intensity of the optical modulation signal generated by the I/Q modulator, the waveform distortion may be monitored and corrected. That is, without coherent reception by which the intensity and the phase of the optical signal are detected, the waveform distortion may be monitored and corrected. The prices of the optical receiver 32 and the ADC 33 are lower than that of a coherent receiver. In addition, the functions of the synchronization section 44, the signal extraction section 45, the coder 46, and the MMSE calculation circuit 61 are achieved by the digital signal processing section. Therefore, the optical transmitter 1B may monitor and correct waveform distortion generated so as to be caused by the imperfection of the transmitter, at low cost.

In the above-described embodiment, the distortion correction sections 48a to 48d are obtained by the FIR filter, but the embodiment is not limited to such an example. For example, the distortion correction sections 48a to 48d may be a circuit having a configuration for which high-order responses is considered (for example, a configuration using Volterra series), or a configuration in which the electric field information signal is corrected using a look-up table.

In addition, in the above-described embodiment, as an example of the distortion detection section 47, the MMSE algorithm is employed, but the embodiment is not limited to such an example. That is, the distortion detection section 47 according to the first embodiment may use a least mean square (LMS) algorithm used to change a distortion correction value sequentially so that an error between the distortion detection signal and the coded training signal is minimized and determine a correction value.

Second Embodiment

In the second embodiment, waveform distortion caused by a reduction in an extinction ratio of the I/Q modulator is corrected. The extinction ratio of the I/Q modulator is reduced so as to be caused by an extinction ratio of the Mach-Zehnder interferometer provided in each of the arms of the I/Q modulator, a branching ratio to each of the arms, or imbalance of insertion loss of an optical waveguide. In addition, even in the second embodiment, waveform distortion caused by non-linear response of the I/Q modulator is also corrected.

Figure 12:
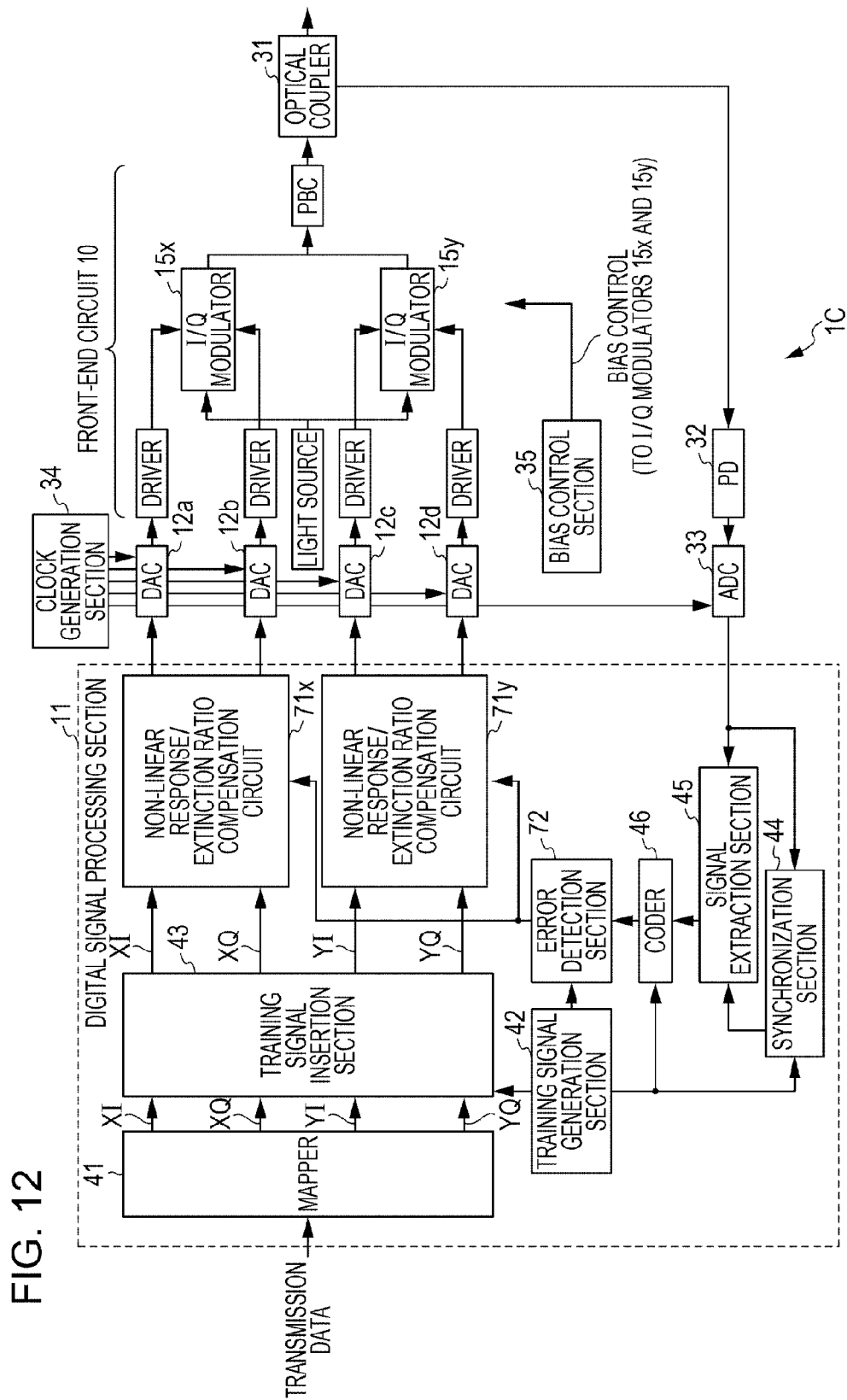
FIG. 12 is a diagram illustrating an example of a configuration of an optical transmitter according to a second embodiment.

FIG. 12 is a diagram illustrating an example of a configuration of an optical transmitter according to the second embodiment. A configuration of an optical transmitter 1C according to the second embodiment is similar to that of the optical transmitter 1B according to the first embodiment illustrated in FIG. 9. However, in the optical transmitter 1C according to the second embodiment, a non-linear response/extinction ratio compensation circuit 71x is provided instead of the distortion correction sections 48a and 48b, and a non-linear response/extinction ratio compensation circuit 71y is provided instead of the distortion correction sections 48c and 48d. In addition, the optical transmitter 1C includes an error detection section 72 as an example of the distortion detection section 47.

The operations of the training signal generation section 42, the training signal insertion section 43, the signal extraction section 45, and the coder 46 are practically the same in the first and second embodiments. That is, in the second embodiment, the training signal insertion section 43 inserts the training signal illustrated in FIG. 6 into the electric field information signal. In addition, the coder 46 generates a coded training signal from the intensity signal indicating the intensity of the optical signal.

In the I/Q modulators 15x and 15y, an electric field $E_{mzm}$ of an output light of the Mach-Zehnder interferometer provided in each of the arms is represented by the formula (1). The formula (1) represents an electric field of an output light of the I arm. That is, "I" indicates a drive signal of the I arm.

$$E_{mzm} = \frac{1}{\sqrt{2}} * \left\{ a * \exp\left(j\pi\left(\frac{I}{2}+0.5\right)\right) + \sqrt{1-a^2} * \exp\left(-j\pi\left(\frac{I}{2}+0.5\right)\right) \right\} \quad (1)$$

$$= \frac{1}{\sqrt{2}} * \left\{ \left\{ a * \cos\left(\pi\left(\frac{I}{2}+0.5\right)\right) + \sqrt{1-a^2} * \cos\left(\pi\left(\frac{I}{2}+0.5\right)\right) \right\} + j\left\{ a * \sin\left(\pi\left(\frac{I}{2}+0.5\right)\right) - \sqrt{1-a^2} * \sin\left(\pi\left(\frac{I}{2}+0.5\right)\right) \right\} \right\}$$

In the formula (1), "a" is a parameter that depends on an extinction ratio of the interferometer. The relationship between the extinction ratio and the parameter a is represented by the formula (2).

$$\text{Extinction Ratio} = 10 * \log\left(\left\{\frac{a+\sqrt{1-a^2}}{a-\sqrt{1-a^2}}\right\}^2\right) \quad (2)$$

In the formula (2), when the parameter a is √0.5, the extinction ratio becomes infinite. That is, "a=√0.5" corresponds to a state in which the extinction ratio is optimized. In this case, the complex number component of the formula (1) is zero. In addition, when the extinction ratio is reduced, the complex number component does not become zero. In this case, crosstalk occurs between the I arm and the Q arm. Therefore, in the second embodiment, the electric field information signal is corrected so that the crosstalk component is removed.

Figure 13:
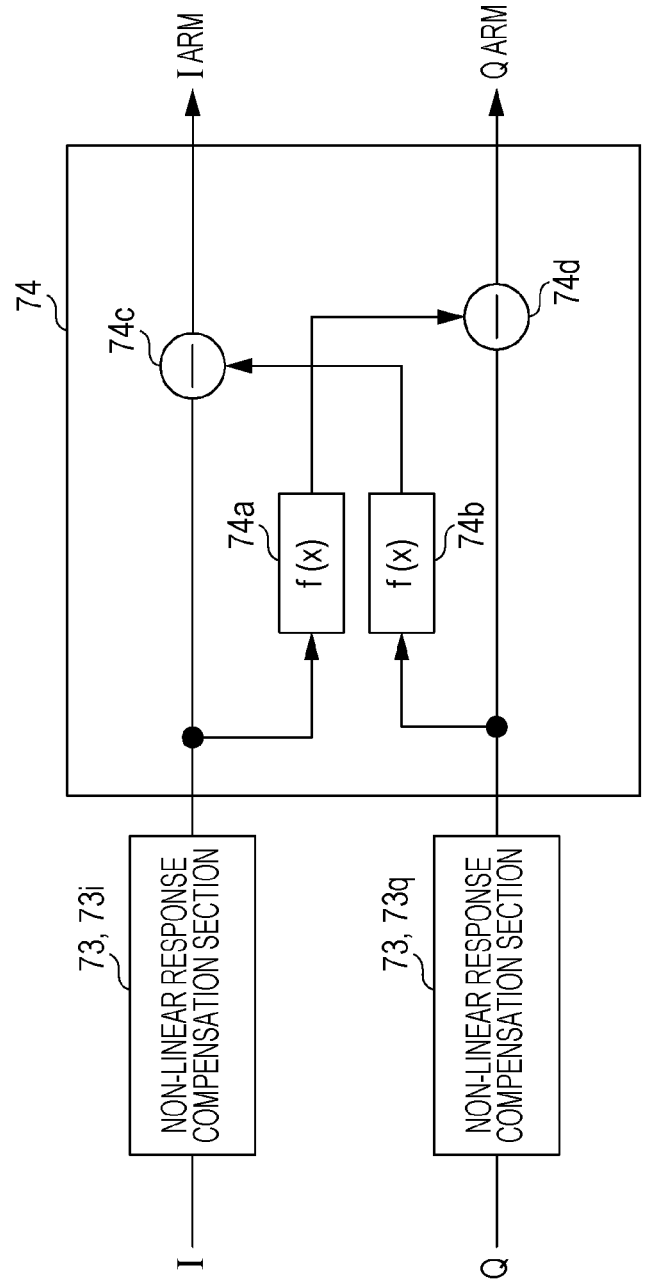
FIG. 13 is a diagram illustrating an example of non-linear response and a configuration of an extinction ratio compensation circuit.

FIG. 13 is a diagram illustrating an example of a configuration of each of the non-linear response/extinction ratio compensation circuits 71x and 71y. The configurations of the non-linear response/extinction ratio compensation circuits 71x and 71y are the same as each other. That is, each of the non-linear response/extinction ratio compensation circuits 71x and 71y includes non-linear response compensation sections 73i and 73q, and an extinction ratio distortion compensation section 74.

The extinction ratio distortion compensation section 74 includes function calculation circuits 74a and 74b, and subtractors 74c and 74d. The function calculation circuit 74a executes calculation by a function f for an input signal I. The function calculation circuit 74b executes calculation by a function f for an input signal Q. The subtractor 74c subtracts the calculation result obtained by the function calculation section 74b from the input signal I. The subtractor 74d subtracts the calculation result obtained by the function calculation section 74a from the input signal Q.

An operation when the training signal a illustrated in FIG. 6 is applied to the front-end circuit 10 is described below. In this case, an electric field of an output light of the I arm of the I/Q modulator 15x is represented by the formula (1). In addition, both of the Q arm of the I/Q modulator 15x and the I arm and the Q arm of the I/Q modulator 15y are in a quenching state. Thus, the optical signal output from the front-end circuit 10 is represented by the formula (1), and the coded training signal generated by the coder 46 is practically represented by the formula (1).

In addition, the function calculation circuit 74a generates a signal f (x). Therefore, the output signal of the subtractor 74d is represented as "−f (x)". In addition, such a signal is applied to the Q arm of the I/Q modulator 15x. Here, the optical signal of the I arm of the I/Q modulator 15x is represented by the formula (1). Thus, the optical signal output from the I/Q modulator 15x is represented by the following formula. Here, "output of the I/Q modulator 15x=$E_{mzm}$+(−f(x))" is satisfied.

In such a calculation formula, when the signal f (x) is matched with the complex number component of the formula (1), a crosstalk component is cancelled. In addition, when the crosstalk component is cancelled, it is expected that an error between the training signal inserted into the electric field information signal (here, the distortion detection signal) and the coded training signal generated from the intensity signal indicating the intensity of the optical signal becomes zero.

Therefore, the error detection section 72 controls the function calculation circuit 74a so that the error between the distortion detection signal and the coded training signal is reduced. As a result, the signal f (x) generated by the function calculation circuit 74a gets close to the complex number component of the formula (1), and crosstalk from the I arm to the Q arm is suppressed. The control of the function calculation circuit 74a is achieved by controlling the parameter a by training.

The other Mach-Zehnder interferometer is adjusted by a similar method. That is, the Q arm of the I/Q modulator 15x is adjusted by controlling the function calculation circuit 74b using the training signal b. In addition, the I arm and the Q arm of the I/Q modulator 15y are respectively adjusted using the training signals c and d.

A waveform distortion correction method by non-linear response of the Mach-Zehnder interferometer provided in each of the arms of the I/Q modulator is described below. The waveform distortion by the non-linear response is corrected by the non-linear response compensation sections 73 (73i and 73q). For example, the waveform distortion in the Mach-Zehnder interferometer of the I arm of the I/Q modulator 15x is corrected using the training signal a, by utilizing the non-linear response compensation section 73i of the non-linear response/extinction ratio compensation circuit 71x. In addition, the waveform distortion in the Mach-Zehnder interferometer of the Q arm of the I/Q modulator 15x is corrected using the training signal b, by utilizing the non-linear response compensation section 73q of the non-linear response/extinction ratio compensation circuit 71x.

As illustrated in FIG. 4 and the formula (1), the intensity of an output light of the Mach-Zehnder interferometer of each of the arms is represented by a sine function for drive voltage. That is, the Mach-Zehnder interferometer performs non-linear response on the drive signal. Therefore, the non-linear response compensation section 73 provides a function indicating the reverse characteristic of the sine function of the Mach-Zehnder interferometer (hereinafter referred to as "non-linear response compensation function") in order to compensate the non-linear response.

The non-linear response compensation function of the I arm is represented by "a*cos(I)*(a/π)". In addition, the non-linear response compensation function of the Q arm is represented by "a*cos(Q)*(a/π)". Here, the parameter a depends on "Vπ" and the amplitude of the drive signal of the Mach-Zehnder interferometer. "Vπ" corresponds to voltage desired to shift the phase of the output light of the Mach-Zehnder interferometer by π. In addition, the non-linear response compensation section 73 corrects the parameter a by training.

For example, the method in which the parameter a is controlled is practically the same as that of the first embodiment. That is, the error detection section 72 calculates an error between the distortion detection signal generated by the training signal generation section 42 and the coded training signal. In addition, the error detection section 72 controls the non-linear response compensation section 73 so that the error is reduced. In this case, the parameter a is controlled by training. As a result, the non-linear response compensation function provided by the non-linear response compensation section 73 gets close to the inverse function of the sine function of the corresponding Mach-Zehnder interferometer, so that the non-linear response characteristic is compensated.

Third Embodiment

Figure 14:
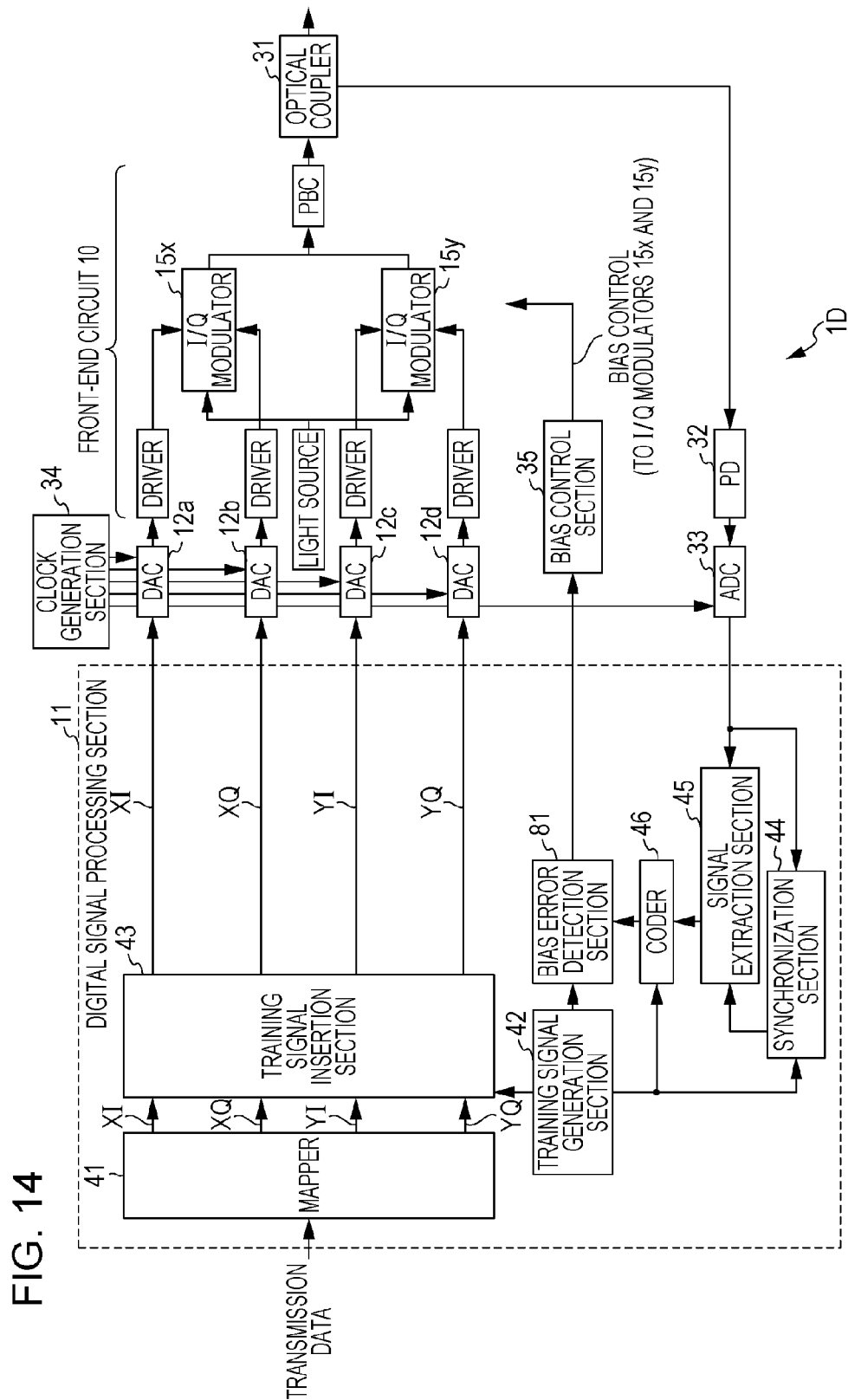
FIG. 14 is a diagram illustrating an example of a configuration of an optical transmitter according to a third embodiment.

FIG. 14 is a diagram illustrating an example of a configuration of an optical transmitter according to the third embodiment. An optical transmitter 1D according to the third embodiment includes a bias error detection section 81, as an example of the distortion detection section 47. In addition, the optical transmitter 1D may correct waveform distortion caused by a deviation of bias of each of the arms of the I/Q modulator.

The operations of the training signal generation section 42, the training signal insertion section 43, the synchronization section 44, the signal extraction section 45, and the coder 46 are practically the same as those of the first and third embodiments. That is, the training signal generation section 42 generates the training signal illustrated in FIG. 6, similar to the first embodiment. In addition, the training signal insertion section 43 inserts the training signal into the electric field information signal. The training signal inserted into the electric field information signal (distortion detection signal) is, for example, as illustrated in FIG. 10A. In this case, the intensity signal illustrated in FIG. 10B is obtained by the optical receiver 32. However, in the distortion detection signal in the third embodiment, the number of bits to which a positive value is assigned and the number of bits to which a negative value is assigned are the same as each other or substantially the same.

The intensity signal is converted into a digital signal by the ADC 33, and applied to the digital signal processing section 11. Therefore, the signal extraction section 45 extracts a signal component corresponding to the training signal (that is, intensity training signal) from the intensity signal. The coder 46 generates an amplitude information signal by calculating a square root of the extracted intensity training signal. Similar to the first embodiment, the calculation of a square root may not be desired. In addition, based on a positive sign or a negative sign of each of the bits of the distortion detection signal generated by the training signal generation section 42, the coder 46 codes each of corresponding bits of the amplitude information signal. The same coded algorithm is used between the first and third embodiments. Therefore, the coded training signal illustrated in FIG. 10C is obtained by the coder 46.

Figure 15:
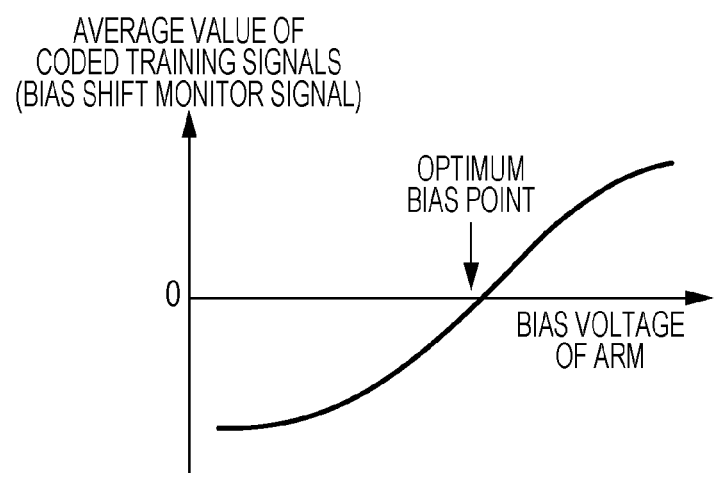
FIG. 15 is a diagram illustrating optimization of arm bias.

The bias error detection section 81 calculates an average of the coded training signals. Here, in the distortion detection signal in the third embodiment, the number of bits to which a positive value is assigned and the number of bits to which a negative value is assigned are the same as each other or substantially the same. Therefore, when bias of the corresponding arm of the I/Q modulator is controlled appropriately, it is assumed that the average of the coded training signals is to become zero or practically zero, as illustrated in FIG. 15. On the contrary, when the bias of the corresponding arm of the I/Q modulator is not controlled appropriately, the average of the coded training signals does not become zero. Here, the direction of a deviation of bias voltage for an optimum point is detected depending on whether the average of the coded training signals is larger than zero. In addition, an absolute value of the average of the coded training signals indicates the size of the deviation of the bias voltage for the optimum point. Therefore, the average of the coded training signals may be used as a bias deviation monitor signal indicating the deviation of the bias voltage.

As described above, the average of the coded training signals indicates a deviation of bias of the corresponding arm of the I/Q modulator. That is, the bias error detection section 81 detects the deviation of the bias of the corresponding arm of the I/Q modulator by calculating the average of the coded training signals. In addition, the bias error detection section 81 instructs the bias control section 35 to cause the average of the coded training signals to get close to zero. For example, in the embodiment illustrated in FIG. 15, when the average of the coded training signals is larger than zero, the bias error detection section 81 instructs the bias control section 35 to reduce the bias voltage. In addition, when the average of the coded training signals is smaller than zero, the bias error detection section 81 instructs the bias control section 35 to increase the bias voltage. Therefore, the bias control section 35 controls the bias voltage of the corresponding arm of the I/Q modulator, in response to the instruction. As a result, the bias of the corresponding arm of the I/Q modulator is optimized, and the waveform distortion is corrected.

Figure 16:
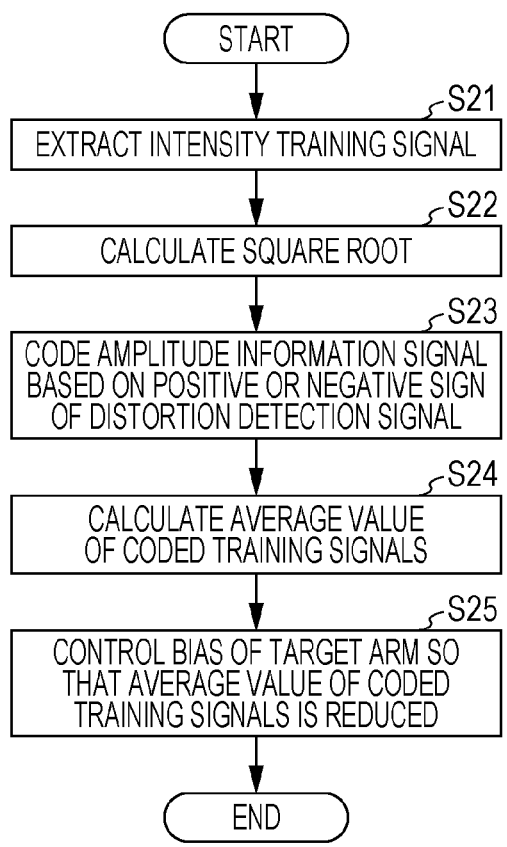
FIG. 16 is a flowchart illustrating waveform distortion correction processing according to a third embodiment.

FIG. 16 is a flowchart illustrating waveform distortion correction processing according to the third embodiment. The processing of the flowchart is executed for each of the arms of each of the I/Q modulators. In addition, it is assumed that the training signal insertion section 43 inserts the training signal illustrated in FIG. 6 into the electric field information signal repeatedly.

The processing of S21 to S23 is practically the same as the processing of S11 to S13 in the first embodiment. That is, an intensity training signal corresponding to the training signal is extracted from the intensity signal indicating the intensity of the optical signal, and a coded training signal is generated from the extracted intensity training signal. In S24, the bias error detection section 81 calculates an average of the coded training signals. In S25, the bias error detection section 81 assigns, to the bias control section 35, a control signal used to control bias voltage of a target arm so that the calculated average is reduced. Therefore, the bias control section 35 controls the bias voltage of the target arm in accordance with the control signal.

Fourth Embodiment

In the third embodiment, waveform distortion caused by a deviation of bias of each of the arms of the I/Q modulator is corrected. On the contrary, in the fourth embodiment, waveform distortion caused by a deviation of bias of the phase shifter of the I/Q modulator is corrected. The configurations of the optical transmitters are substantially the same in the third and fourth embodiments.

FIG. 17 is a diagram illustrating examples of training signals used in the fourth embodiment. The training signals used in the fourth embodiment includes synchronization signals and training signals e and f. The training signal e is used to control bias of the phase shifter of the I/Q modulator 15x, and the training signal f is used to control bias of the phase shifter of the I/Q modulator 15y. The training signal e includes a distortion detection signal TXI inserted into an XI channel and a distortion detection signal TXQ inserted into an XQ channel. In addition, the training signal f includes a distortion detection signal TYI inserted into a YI channel and a distortion detection signal TYQ inserted into a YQ channel.

A control method of bias of the phase shifter of the I/Q modulator using the above-described training signal is described below. A case is described below in which bias of the phase shifter of the I/Q modulator 15x is controlled.

Figure 18A:
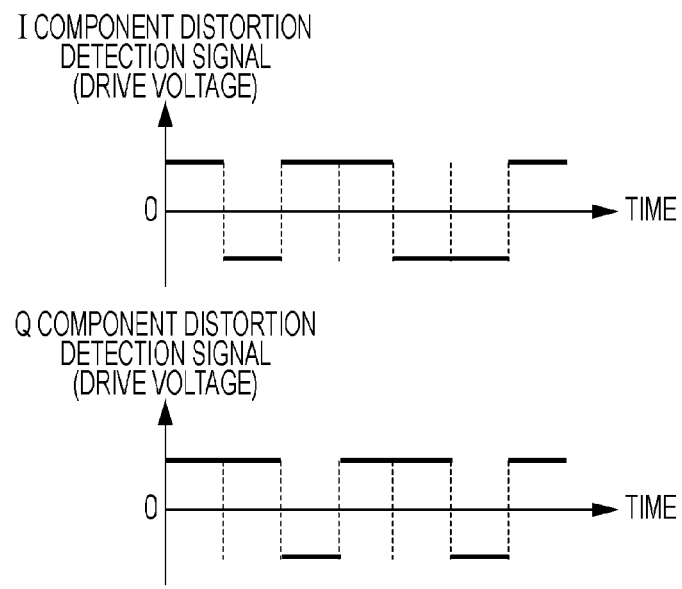
FIGS. 18A, 18B, and 18C are diagrams illustrating a waveform distortion correction method according to the fourth embodiment.

FIG. 18A illustrates an example of the training signals respectively inserted into the electric field information signals XI and XQ (that is, distortion detection signals TXI and TXQ). In the embodiment, the distortion detection signals TXI and TXQ are binary signals each of which is configured by "1" and "−1", similar to the first embodiment. However, data patterns of the distortion detection signals TXI and TXQ are different from each other. In addition, it is assumed that the number of bits that match between the distortion detection signals TXI and TXQ and the number of bits that do not match between the distortion detection signals TXI and TXQ are the same as each other or substantially the same.

Figure 18B:
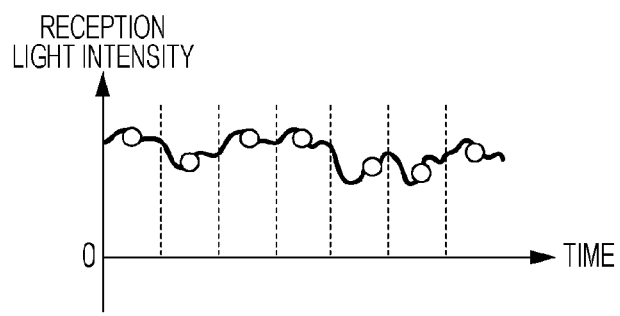

FIG. 18B is a diagram illustrating the intensity of the optical signal corresponding to the training signal illustrated in FIG. 18A. The optical signals include an optical signal generated by the distortion detection signal TXI in the I arm and an optical signal generated by the distortion detection signal TXQ in the Q arm. As described above, the intensity of the optical signal is detected by the optical receiver 32. That is, the optical receiver 32 generates an intensity signal indicating the intensity of the optical signal. The intensity signal is converted into a digital signal by the ADC 33. Therefore, the signal extraction section 45 extracts a synthesized signal of the distortion detection signal TXI and the distortion detection signal TXQ from the intensity signal. In addition, the signal that has been extracted by the signal extraction section 45 is led to the coder 46.

Similar to the first embodiment, the coder 46 generates an amplitude information signal by calculating a square root of the signal that has been extracted by the signal extraction section 45, for each of the bits. After that, the coder 46 generates a coded training signal by coding the amplitude information signal using the training signals generated by the training signal generation section 42 (that is, a set of distortion detection signals). However, the coded algorithm in the fourth embodiment is different from those of the first to third embodiments.

In the fourth embodiment, based on whether the signs of the bits of the set of distortion detection signals match, a positive sign or negative sign is applied to each of the corresponding bits of the amplitude information signal. In the embodiment illustrated in FIG. 10A, the signs of the first bits in the set of distortion detection signals are "positive", so that "positive" is applied to the first bit of the amplitude information signal. In this case, the value of the first bit of the amplitude information signal is not changed. In the second bits, the distortion detection signal of the I arm is "negative", and the distortion detection signal of the Q arm is "positive", so that "negative" is applied to the second bit of the amplitude information signal. In this case, the sign of the second bit of the amplitude information signal is inverted. As described above, the amplitude information signal is coded based on whether the signs of the bits of the set of distortion detection signals match. Therefore, even in the fourth embodiment, it is desirable that the value of each of the bits of the distortion detection signal is not zero.

Figure 18C:
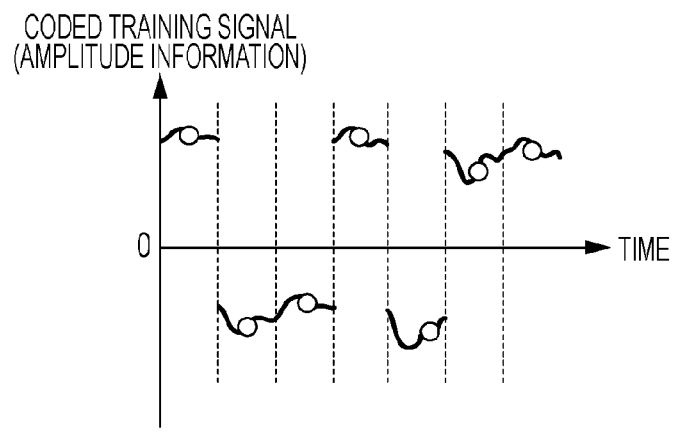

FIG. 18C is a diagram illustrating a coded training signal generated by the coder 46. In the embodiment, the signs match in the first bits, the fourth bits, the sixth bits, and the seventh bits of the set of distortion detection signals, so that "positive" is applied to the first bit, the fourth bit, the sixth bit, and the seventh bit of the coded training signal. In addition, the signs do not match in the second bits, the third bits, and the fifth bits of the set of distortion detection signals, so that "negative" is applied to the second bit, the third bit, and the fifth bit of the coded training signal.

Figure 19:
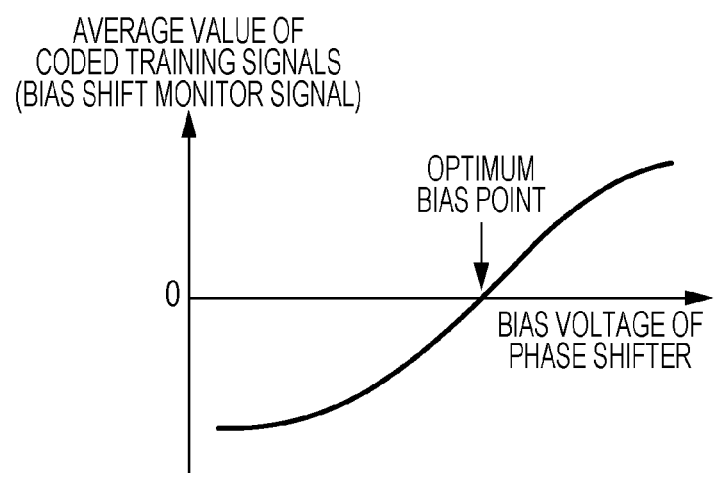
FIG. 19 is a diagram illustrating optimization of phase shifter bias.

The bias error detection section 81 calculates an average of the coded training signals. Here, the number of bits in each of which the signs match between the set of distortion detection signals inserted into the electric field information signals at the same time and the number of bits in each of which the signs do not match between the set of distortion detection signals inserted into the electric field information signals at the same time are the same as each other or substantially the same. Thus, when bias of the phase shifter of the I/Q modulator is controlled appropriately, the average of the coded training signals becomes zero or practically zero, as illustrated in FIG. 19. On the contrary, when the bias of the phase shifter of the I/Q modulator is not controlled appropriately, the average of the coded training signals does not become zero. Here, the direction of a deviation of bias voltage for the optimum point is detected by the sign of the average of the coded training signals. In addition, an absolute value of the average of the coded training signals indicates the deviation of bias voltage for the optimum point.

As described above, an average of coded training signals indicates a deviation of bias of the phase shifter of the I/Q modulator. That is, the bias error detection section 81 detects the deviation of the bias of the phase shifter of the I/Q modulator by calculating the average of the coded training signals. In addition, the bias error detection section 81 instructs the bias control section 35 to cause the average of the coded training signals to get close to zero. For example, in the embodiment illustrated in FIG. 19, when the average of the coded training signals is larger than zero, the bias error detection section 81 instructs the bias control section 35 to reduce the bias voltage. In addition, when the average of the coded training signals is smaller than zero, the bias error detection section 81 instructs the bias control section 35 to increase the bias voltage. Therefore, the bias control section 35 controls bias voltage of the phase shifter of the corresponding I/Q modulator, in response to the instruction. As a result, the bias of the phase shifter of the I/Q modulator is optimized, and the waveform distortion is corrected.

Figure 20:
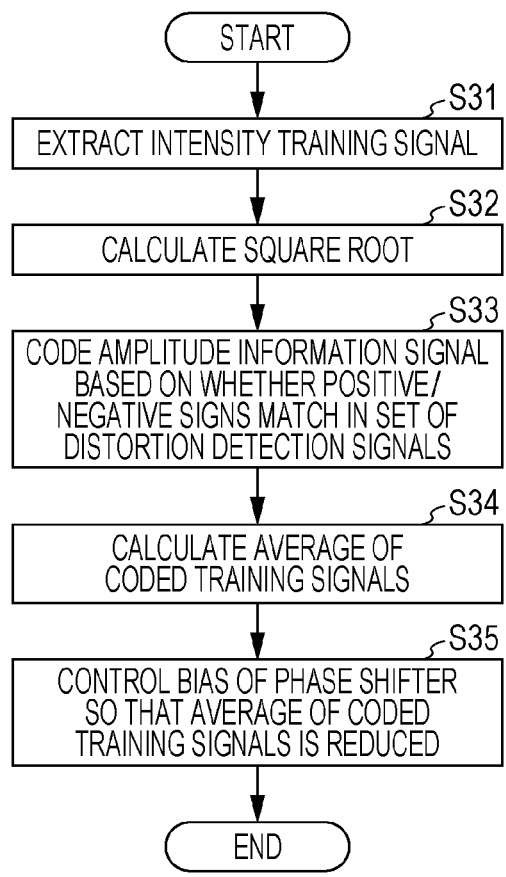
FIG. 20 is a flowchart illustrating waveform distortion correction processing according to the fourth embodiment.

FIG. 20 is a flowchart illustrating waveform distortion correction processing according to the fourth embodiment. The processing of the flowchart is executed for each of the I/Q modulators. In addition, the training signal insertion section 43 inserts the training signal illustrated in FIG. 17 into the electric field information signal repeatedly.

The processing of S31 to S35 is similar to the processing of S21 to S25 of the third embodiment. However, in the fourth embodiment, in S33, based on whether the signs match as positive signs or negative signs in each of the bits of the set of distortion detection signals, the coder 46 codes each of the corresponding bits of the amplitude information signal. In addition, in S35, the bias error detection section 81 assigns, to the bias control section 35, a control signal used to control the bias voltage of the phase shifter so that the average of the coded training signals is reduced. Therefore, the bias control section 35 controls the bias voltage of the phase shifter in accordance with the control signal.

Other Embodiments

In the embodiment illustrated in FIG. 10B, 18B, or the like, a sampling rate of the ADC 33 is the same as the symbol rate of transmission data, but the embodiment is not limited to such an example. For example, when the sampling rate of the ADC 33 is lower than the symbol rate of the transmission data, the ADC 33 may generate digital data indicating the intensity waveform of the optical signal by up-sampling the intensity signal generated by the optical receiver 32.

In addition, the training signal is inserted into the electric field information signal, at prescribed frame intervals. In addition, the training signal having an identical data pattern is inserted into the electric field information signal repeatedly. Therefore, the ADC 33 may generate digital data indicating the waveform of an intensity signal using a method similar to a sampling oscilloscope. In this case, the sampling rate of the ADC 33 is "$R_{symbol}/n+\Delta R$". Here, "$R_{symbol}$" indicates a symbol rate. In addition, "n" is an integer of 2 or more. "$\Delta R$" is a sufficiently small value as compared with the symbol rate. In addition, the digital signal processing section 11 may obtain the waveform of an intensity signal by combining pieces of data that has been sampled at a plurality of timings. In the configuration, the ADC 33 is obtained by a low-capacity device, so that cost of the optical transmitter may be reduced.

The training signal is not limited to the binary signal. That is, the training signal may be achieved by a multivalue signal. In addition, the above-described first to fourth embodiments may be combined arbitrarily.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmitter comprising
   a digital signal processing section configured to include a digital signal processor, a field programmable gate array, an application specific integrated circuit and/or a circuit, and the digital signal processing section configured to include:
   a mapper configured to generate an electric field information signal from transmission data,
   a training signal generation section configured to generate a training signal,
   a training signal insertion section configured to insert the training signal into the electric field information signal,
   a training signal extraction section configured to extract an intensity training signal corresponding to the training signal, from an intensity signal;
   a coder configured to generate a coded training signal by coding the intensity training signal extracted by the training signal extraction section using the training signal generated by the training signal generation section, and
   a distortion detection section configured to detect waveform distortion of an optical modulation signal, based on the coded training signal;
   a driver configured to generate a drive signal from the electric field information signal into which the training signal is inserted;
   a modulator configured to generate the optical modulation signal based on the drive signal; and
   an optical receiver configured to generate the intensity signal for indicating intensity of the optical modulation signal, the optical receiver being included in the optical transmitter.

2. The optical transmitter according to claim 1 further comprising:
   a distortion correction section configured to correct the electric field information signal in accordance with the waveform distortion detected by the distortion detection section.

3. The optical transmitter according to claim 2, wherein
   the distortion detection section is configured to detect the waveform distortion of the optical modulation signal by calculating an error between the training signal generated by the training signal generation section and the coded training signal, and
   the distortion correction section is configured to correct the electric field information signal generated by the mapper so that the error is reduced.

4. The optical transmitter according to claim 1, wherein
   the coder is configured to generate an amplitude information signal indicating a square root of the intensity training signal extracted by the training signal extraction section, and generate the coded training signal by coding the amplitude information signal using the training signal generated by the training signal generation section.

5. The optical transmitter according to claim 4, wherein
   a first value or a second value is assigned to each bit of the training signal generated by the training signal generation section,
   the first value is a positive value,
   the second value is a negative value,
   absolute values of the first value and the second value are identical to each other, and
   the coder is configured to generate the coded training signal by applying a positive sign or a negative sign of the value assigned to each of the bits of the training signal generated by the training signal generation section, to each of corresponding bits of the amplitude information signal.

6. The optical transmitter according to claim 1, wherein
   the modulator is a Mach-Zehnder modulator including a first arm modulator and a second arm modulator, and
   the mapper is configured to generate a first electric field information signal and a second electric field information signal from the transmission data,
   the training signal generation section is configured to generate a first training signal and a second training signal,
   the training signal insertion section is configured to respectively insert the first training signal and the second training signal into the first electric field information signal and the second electric field information signal,
   the optical transmitter is further configured to include a calculation circuit that generates a first calculation result signal by multiplying the first electric field information signal into which the first training signal is inserted, by a first function, and generates a second calculation result signal by multiplying the second electric field information into which the second training signal is inserted, by a second function,
   the driver is configured to generate a first drive signal used to drive the first arm modulator from the first electric field information signal into which the first training signal is inserted and the second calculation result signal, and generate a second drive signal used to drive the second arm modulator from the second electric field information signal into which the second training signal is inserted and the first calculation result signal,
   the training signal extraction section is configured to extract a first intensity training signal corresponding the first training signal from the intensity signal generated by the optical receiver when the second training signal is zero, and extract a second intensity training signal corresponding to the second training signal from the intensity signal generated by the optical receiver when the first training signal is zero, the coder is configured to generate a first coded training signal by coding the first intensity training signal extracted by the training signal extraction section using the first training signal generated by the training signal generation section, and generate a second coded training signal by coding the second intensity training signal extracted by the training signal extraction section using the second training signal generated by the training signal generation section, and the calculation circuit is configured to correct the first function based on an error between the first training signal generated by the training signal generation section and the first coded training signal, and correct the second function based on an error between the second training signal generated by the training signal generation section and the second coded training signal.

7. The optical transmitter according to claim 1 further comprising:

a bias correction section configured to correct bias of the modulator in accordance with the waveform distortion detected by the distortion detection section.

8. The optical transmitter according to claim 7, wherein the coder is configured to generate an amplitude information signal indicating a square root of the intensity training signal extracted by the training signal extraction section, and generate the coded training signal by coding the amplitude information signal using the training signal generated by the training signal generation section.

9. The optical transmitter according to claim 8, wherein a first value or a second value is assigned to each bit of the training signal generated by the training signal generation section, the first value is a positive value, the second value is a negative value, absolute values of the first value and the second value are identical to each other, the number of bits to which the first value is assigned and the number of bits to which the second value is assigned are identical to each other or substantially identical in the training signal generated by the training signal generation section, and the coder is configured to generate the coded training signal by applying a positive sign or a negative sign of the value assigned to each of the bits of the training signal generated by the training signal generation section, to each of corresponding bits of the amplitude information signal.

10. The optical transmitter according to claim 9, wherein the distortion detection section is configured to detect the waveform distortion of the optical modulation signal by calculating an average of the coded training signals, and the bias correction section is configured to correct the bias of the modulator so that the average of the coded training signals is reduced.

11. The optical transmitter according to claim 1, wherein the modulator is a Mach-Zehnder modulator including a first arm modulator, a second arm modulator, a phase shifter configured to apply a prescribed phase difference between the first arm modulator and the second arm modulator, and the optical transmitter further includes a bias correction section is configured to correct bias of the phase shifter of the modulator in accordance with the waveform distortion detected by the distortion detection section.

12. The optical transmitter according to claim 11, wherein the mapper is configured to generate a first electric field information signal and a second electric field information signal from the transmission data, the training signal generation section is configured to generate a first training signal and a second training signal different from the first training signal, the training signal insertion section is respectively configured to insert the first training signal and the second training signal into the first electric field information signal and the second electric field information signal, the driver is configured to generate a first drive signal that drives the first arm modulator from the first electric field information signal into which the first training signal is inserted, and generate a second drive signal that drives the second arm modulator from the second electric field information signal into which the second training signal is inserted, the training signal extraction section is configured to extract a synthesized signal of a first intensity training signal corresponding to the first training signal and a second intensity training signal corresponding to the second training signal, from the intensity signal generated by the optical receiver, a first value or a second value is assigned to each bit of the first training signal and the second training signal generated by the training signal generation section, the first value is a positive value, the second value is a negative value, absolute values of the first value and the second value are identical to each other, the number of bits that match to each other and the number of bits that do not match between the first training signal and the second training signal generated by the training signal generation section are identical to each other or substantially identical, the coder is configured to generate an amplitude information signal indicating a square root of the synthesized signal, and generates the coded training signal by applying a positive sign or a negative sign indicating whether or not values respectively assigned to each bit of the first training signal and each bit of the second training signal generated by the training signal generation section, are identical to each other, to each of corresponding bits of the amplitude information signal, the distortion detection section is configured to detect the waveform distortion of the optical modulation signal by calculating an average of the coded training signals, and the bias correction section is configured to correct bias of the phase shifter of the modulator so that the average of the coded training signals is reduced.

13. A waveform distortion correction method in an optical transmitter, the method comprising:

generating a training signal;

inserting the training signal into an electric field information signal indicating transmission data;

generating a drive signal from the electric field information signal into which the training signal is inserted;

generating, by an optical receiver of the optical transmitter, an intensity signal for indicating intensity of an optical modulation signal generated by a modulator based on the drive signal;

extracting an intensity training signal corresponding to the training signal from the intensity signal;

generating a coded training signal by coding the extracted intensity training signal using the generated training signal;
detecting waveform distortion of the optical modulation signal based on the coded training signal; and
correcting the electric field information signal in accordance with the detected waveform distortion.

\* \* \* \* \*